(12) United States Patent
Diem

(10) Patent No.: US 10,277,689 B1
(45) Date of Patent: *Apr. 30, 2019

(54) METHOD FOR CONTROLLING CONVEYANCE OF EVENTS BY DRIVER ADMINISTRATOR OF VEHICLES EQUIPPED WITH ELDS

(71) Applicant: PERDIEMCO LLC, Marshall, TX (US)

(72) Inventor: Darrell Diem, Madison, AL (US)

(73) Assignee: Perdiemco LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,330

(22) Filed: Nov. 21, 2018

Related U.S. Application Data

(60) Continuation of application No. 15/996,149, filed on Jun. 1, 2018, now Pat. No. 10,148,774, which is a
(Continued)

(51) Int. Cl.
*H04L 29/08* (2006.01)
*H04L 29/06* (2006.01)
(Continued)

(52) U.S. Cl.
CPC ............ *H04L 67/18* (2013.01); *H04L 63/104* (2013.01); *H04L 63/105* (2013.01);
(Continued)

(58) Field of Classification Search
CPC ......... H04W 40/30; H04W 4/80; H04W 4/02; H04W 4/20; H04W 12/08; H04W 84/12; H04L 63/104; H04L 63/22; H04L 67/24
(Continued)

(56) References Cited

U.S. PATENT DOCUMENTS 5,223,844 A 6/1993 Mandell et al.
5,263,158 A 11/1993 Frederick
(Continued)

FOREIGN PATENT DOCUMENTS

EP 1720370 A1 11/2006
WO 1990013186 11/1990
(Continued)

OTHER PUBLICATIONS

SkyTel, SkyTel FleetHawk Features and Benefits (Sep. 2, 2004), available at https://web.archive.org/web/20040902051242/http://www.skytel.com/products/fleethawk_features.htm (visited Nov. 18, 2015).
(Continued)

*Primary Examiner* — Congvan Tran
(74) *Attorney, Agent, or Firm* — Vector IP Law Group; Robert S. Babayi

(57) ABSTRACT

An improved system and method for defining an event based upon an object location and a user-defined zone and managing the conveyance of object location event information among computing devices where object location events are defined in terms of a condition based upon a relationship between user-defined zone information and object location information. One or more location information sources are associated with an object to provide the object location information. One or more user-defined zones are defined on a map and one or more object location events are defined. The occurrence of an object location event produces object location event information that is conveyed to users based on user identification codes. Accessibility to object location information, zone information, and object location event information is based upon an object location information access code, a zone information access code, and an object location event information access code, respectively.

32 Claims, 21 Drawing Sheets

Related U.S. Application Data continuation of application No. 15/986,677, filed on May 22, 2018, now Pat. No. 10,171,950, which is a continuation of application No. 15/915,402, filed on Mar. 8, 2018, now Pat. No. 10,021,198, which is a division of application No. 15/848,367, filed on Dec. 20, 2017, now Pat. No. 9,954,961, which is a continuation of application No. 15/483,682, filed on Apr. 10, 2017, now Pat. No. 9,871,874, which is a continuation of application No. 15/200,592, filed on Jul. 1, 2016, now Pat. No. 9,621,661, which is a continuation of application No. 14/629,343, filed on Feb. 23, 2015, now Pat. No. 9,485,314, which is a continuation of application No. 14/270,890, filed on May 6, 2014, now Pat. No. 9,003,499, which is a continuation of application No. 13/948,785, filed on Jul. 23, 2013, now Pat. No. 8,717,166, which is a continuation of application No. 13/550,788, filed on Jul. 17, 2012, now Pat. No. 8,493,207, which is a continuation of application No. 13/437,725, filed on Apr. 2, 2012, now Pat. No. 8,223,012, which is a continuation of application No. 12/428,008, filed on Apr. 22, 2009, now Pat. No. 8,149,113, which is a continuation of application No. 11/335,699, filed on Jan. 20, 2006, now Pat. No. 7,525,425.

(60) Provisional application No. 60/752,879, filed on Dec. 23, 2005.

(51) Int. Cl.

| | | |
|---|---|---|
| *H04W 4/30* | (2018.01) | |
| *H04W 4/80* | (2018.01) | |
| *H04W 84/12* | (2009.01) | |
| *H04W 4/02* | (2018.01) | |
| *H04W 4/20* | (2018.01) | |
| *H04W 12/08* | (2009.01) | |
| *H04M 1/725* | (2006.01) | |
| *G06K 7/10* | (2006.01) | |
| *G06Q 10/00* | (2012.01) | |
| *G08B 5/22* | (2006.01) | |

(52) U.S. Cl.
CPC ............ *H04L 63/107* (2013.01); *H04L 67/22* (2013.01); *H04L 67/24* (2013.01); *H04M 1/72572* (2013.01); *H04W 4/02* (2013.01); *H04W 4/20* (2013.01); *H04W 4/30* (2018.02); *H04W 4/80* (2018.02); *H04W 12/08* (2013.01); *H04W 84/12* (2013.01); *G06K 7/10366* (2013.01); *G06Q 10/00* (2013.01); *G08B 5/22* (2013.01); *H04M 1/7253* (2013.01); *H04M 2250/10* (2013.01)

(58) Field of Classification Search
USPC ...... 455/461, 404.2, 456.1; 340/549.11, 988, 340/991, 992, 994
See application file for complete search history.

(56) References Cited

U.S. PATENT DOCUMENTS

| | | | |
|---|---|---|---|
| 5,267,166 | A | 11/1993 | Takata et al. |
| 5,400,246 | A | 3/1995 | Wilson et al. |
| 5,499,182 | A | 3/1996 | Ousborne |
| 5,650,770 | A | 7/1997 | Schlager |
| 5,661,492 | A | 8/1997 | Shoap et al. |
| 5,757,916 | A | 5/1998 | MacDoran et al. |
| 5,839,088 | A | 11/1998 | Hancock et al. |
| 5,982,281 | A | 11/1999 | Hoyt |
| 6,064,970 | A | 5/2000 | McMillan et al. |
| 6,076,028 | A | 6/2000 | Donnelly et al. |
| 6,202,023 | B1 | 3/2001 | Hancock et al. |
| 6,212,392 | B1 | 4/2001 | Fitch et al. |
| 6,243,039 | B1 | 6/2001 | Elliot |
| 6,321,092 | B1 | 11/2001 | Fitch et al. |
| 6,331,825 | B1 | 12/2001 | Ladner et al. |
| 6,339,745 | B1 | 1/2002 | Novik |
| 6,356,834 | B2 | 3/2002 | Hancock et al. |
| 6,363,411 | B1 | 3/2002 | Dugan |
| 6,529,136 | B2 | 3/2003 | Cao et al. |
| 6,553,308 | B1 | 4/2003 | Uhlmann et al. |
| 6,618,593 | B1 | 9/2003 | Drutman et al. |
| 6,633,835 | B1 | 10/2003 | Moran |
| 6,639,516 | B1 | 10/2003 | Copley |
| 6,665,313 | B1 | 12/2003 | Chang |
| 6,687,504 | B1 | 2/2004 | Raith |
| 6,691,032 | B1 | 2/2004 | Irish et al. |
| 6,716,101 | B1 | 4/2004 | Meadows |
| 6,721,652 | B1 | 4/2004 | Sanqunetti |
| 6,801,850 | B1 | 10/2004 | Wolfson |
| 6,806,814 | B1 | 10/2004 | Iverson et al. |
| 6,813,501 | B2 | 11/2004 | Kinnunen et al. |
| 6,813,558 | B1 | 11/2004 | Lapstun et al. |
| 6,838,998 | B1 | 1/2005 | Brown et al. |
| 6,847,892 | B2 | 1/2005 | Zhou |
| 6,850,252 | B1 | 2/2005 | Hoffberg |
| 6,859,171 | B2 | 2/2005 | Durst |
| 6,867,733 | B2 | 3/2005 | Sandhu et al. |
| 6,879,835 | B2 | 4/2005 | Greene et al. |
| 6,885,874 | B2 | 4/2005 | Watkins et al. |
| 6,888,495 | B2 | 5/2005 | Flick |
| 6,888,936 | B1 | 5/2005 | Groen et al. |
| 6,952,181 | B2 | 10/2005 | Karr et al. |
| 6,975,998 | B1 | 12/2005 | Jones |
| 7,000,015 | B2 | 2/2006 | Moore |
| 7,027,808 | B2 | 4/2006 | Wesby |
| 7,034,683 | B2 | 4/2006 | Ghazarian |
| 7,053,780 | B1 | 5/2006 | Straub |
| 7,058,971 | B1 | 6/2006 | Horikiri |
| 7,068,189 | B2 | 6/2006 | Brescia |
| 7,102,510 | B2 | 9/2006 | Boling et al. |
| 7,116,985 | B2 | 10/2006 | Wilson et al. |
| 7,123,926 | B2 | 10/2006 | Himmelstein |
| 7,130,611 | B2 | 10/2006 | Kimura et al. |
| 7,136,915 | B2 | 11/2006 | Rieger |
| 7,138,913 | B2 | 11/2006 | Mackenzie et al. |
| 7,158,016 | B2 | 1/2007 | Cuddihy et al. |
| 7,164,986 | B2 | 1/2007 | Humphries |
| 7,181,227 | B2 | 2/2007 | Wilson et al. |
| 7,190,960 | B2 | 3/2007 | Wilson et al. |
| 7,203,752 | B2 | 4/2007 | Rice et al. |
| 7,219,234 | B1 | 5/2007 | Ashland et al. |
| 7,221,928 | B2 | 5/2007 | Laird |
| 7,231,218 | B2 | 6/2007 | Diacakis et al. |
| 7,236,100 | B2 | 6/2007 | Obradovich et al. |
| 7,259,668 | B2 | 8/2007 | Casey |
| 7,269,426 | B2 | 9/2007 | Kokkonen et al. |
| 7,275,102 | B2 | 9/2007 | Yeager et al. |
| 7,277,018 | B2 | 10/2007 | Reyes et al. |
| 7,283,046 | B2 | 10/2007 | Culpepper |
| 7,283,827 | B2 | 10/2007 | Meadows et al. |
| 7,286,929 | B2 | 10/2007 | Staton |
| 7,295,119 | B2 | 11/2007 | Rappaport et al. |
| 7,317,927 | B2 | 1/2008 | Staton et al. |
| 7,327,258 | B2 | 2/2008 | Fast et al. |
| 7,330,112 | B1 | 2/2008 | Emigh |
| 7,336,964 | B2 | 2/2008 | Casey |
| 7,353,034 | B2 | 4/2008 | Haney |
| 7,359,716 | B2 | 4/2008 | Rowitch et al. |
| 7,359,724 | B2 | 4/2008 | Torvinen |
| 7,366,522 | B2 | 4/2008 | Thomas |
| 7,373,244 | B2 | 5/2008 | Kreft |
| 7,379,729 | B2 | 5/2008 | Holland et al. |
| 7,382,248 | B2 | 6/2008 | Black et al. |
| 7,383,316 | B2 | 6/2008 | Koch |
| 7,423,535 | B2 | 9/2008 | Chung |
| 7,430,471 | B2 | 9/2008 | Simon |
| 7,460,020 | B2 | 12/2008 | Reyes et al. |

(56) References Cited

U.S. PATENT DOCUMENTS

| | | |
|---|---|---|
| 7,460,872 B2 | 12/2008 | Millard |
| 7,469,139 B2 | 12/2008 | Van de Groenendaal |
| 7,474,896 B2 | 1/2009 | Mohi |
| 7,479,899 B2 | 1/2009 | Horstemeyer |
| 7,489,993 B2 | 2/2009 | Coffee et al. |
| 7,503,074 B2 | 3/2009 | Dublish et al. |
| 7,509,116 B2 | 3/2009 | Fan et al. |
| 7,518,500 B2 | 4/2009 | Aninye et al. |
| 7,522,634 B2 | 4/2009 | Casey |
| 7,522,995 B2 | 4/2009 | Nortrup |
| 7,525,426 B2 | 4/2009 | Edelstein et al. |
| 7,525,484 B2 | 4/2009 | Dupray et al. |
| 7,526,800 B2 | 4/2009 | Wright et al. |
| 7,533,157 B2 | 5/2009 | Hu et al. |
| 7,538,667 B2 | 5/2009 | Koen |
| 7,598,855 B2 | 6/2009 | Scalisi et al. |
| 7,577,667 B2 | 8/2009 | Hinshaw et al. |
| 7,660,658 B2 | 2/2010 | Sheynblat |
| 7,664,751 B2 | 2/2010 | O'Sullivan et al. |
| 7,672,677 B2 | 3/2010 | Howard et al. |
| 7,751,829 B2 | 7/2010 | Masuoka et al. |
| 7,752,652 B2 | 7/2010 | Prokupets et al. |
| 7,783,507 B2 | 8/2010 | Schick et al. |
| 7,787,872 B2 | 8/2010 | Minborg et al. |
| 7,791,472 B2 | 9/2010 | Agrawal et al. |
| 7,801,506 B2 | 9/2010 | Haave et al. |
| 7,801,538 B2 | 9/2010 | Weiser |
| 7,848,765 B2 | 12/2010 | Phillips |
| 7,876,239 B2 | 1/2011 | Horstemeyer |
| 7,880,609 B2 | 2/2011 | Viegers et al. |
| 7,899,469 B2 | 3/2011 | Casey |
| 8,005,911 B2 | 8/2011 | Jhanji |
| 8,019,532 B2 | 9/2011 | Sheha |
| 8,032,276 B2 | 10/2011 | Cawse |
| 8,095,115 B2 | 1/2012 | Van de Groenendaal |
| 8,260,239 B2 | 9/2012 | Moton et al. |
| 8,331,952 B2 | 12/2012 | Pagonis |
| 8,370,054 B2 | 2/2013 | Crady |
| 8,461,958 B2 | 6/2013 | Saenz |
| 8,498,814 B2 | 7/2013 | Irish et al. |
| 8,504,057 B2 | 8/2013 | Choi et al. |
| 8,510,319 B2 | 8/2013 | Stevens |
| 8,547,222 B2 | 10/2013 | Aninye et al. |
| 8,559,937 B2 | 10/2013 | Ram et al. |
| 8,593,276 B2 | 11/2013 | Doyle |
| 8,595,056 B2 | 11/2013 | Sohya et al. |
| 8,644,702 B1 | 2/2014 | Kalajan |
| 8,670,928 B2 | 3/2014 | Cawse |
| 8,706,348 B2 | 4/2014 | Beams et al. |
| 8,918,839 B2 | 12/2014 | Vainstein et al. |
| 8,935,220 B2 | 1/2015 | Hancock et al. |
| 2001/0016789 A1 | 8/2001 | Staiger et al. |
| 2001/0018628 A1 | 8/2001 | Jenkins et al. |
| 2001/0039504 A1 | 11/2001 | Linberg et al. |
| 2002/0024443 A1 | 2/2002 | Hawkins et al. |
| 2002/0035605 A1 | 3/2002 | McDowell |
| 2002/0094787 A1 | 7/2002 | Avnet et al. |
| 2002/0184178 A1 | 12/2002 | Tasooji et al. |
| 2003/0023377 A1 | 1/2003 | Chen et al. |
| 2003/0114967 A1 | 6/2003 | Good |
| 2003/0134648 A1 | 7/2003 | Reed |
| 2003/0142797 A1 | 7/2003 | Troy et al. |
| 2003/0204306 A1 | 10/2003 | Yamamoto et al. |
| 2003/0233190 A1 | 12/2003 | Jones |
| 2004/0014478 A1 | 1/2004 | Hoffman |
| 2004/0024658 A1 | 2/2004 | Carbone |
| 2004/0111195 A1 | 6/2004 | de Vries |
| 2004/0139025 A1 | 7/2004 | Coleman |
| 2004/0203951 A1 | 10/2004 | Mazzara et al. |
| 2004/0236596 A1 | 11/2004 | Chowdhary et al. |
| 2005/0064911 A1 | 3/2005 | Chen et al. |
| 2005/0113123 A1 | 5/2005 | Torvinen |
| 2005/0128106 A1 | 6/2005 | Nakaishi et al. |
| 2005/0156715 A1 | 7/2005 | Zou |
| 2005/0168353 A1 | 8/2005 | Dement |
| 2005/0210104 A1 | 9/2005 | Torvinen |
| 2005/0215243 A1 | 9/2005 | Black et al. |
| 2006/0020459 A1 | 1/2006 | Carter et al. |
| 2006/0047379 A1 | 3/2006 | Schullian et al. |
| 2006/0047419 A1 | 3/2006 | Diendorf et al. |
| 2006/0111089 A1 | 5/2006 | Winter |
| 2007/0015495 A1 | 1/2007 | Winter |
| 2007/0060108 A1 | 3/2007 | East et al. |
| 2007/0087828 A1 | 4/2007 | Robertson |
| 2007/0149208 A1 | 6/2007 | Syrbe et al. |
| 2007/0155489 A1 | 7/2007 | Beckley |
| 2007/0156664 A1 | 7/2007 | Norton et al. |
| 2007/0197261 A1 | 8/2007 | Humbel |
| 2007/0214258 A1 | 9/2007 | Karrapanan et al. |
| 2007/0275700 A1 | 11/2007 | Agrawal et al. |
| 2008/0065320 A1 | 3/2008 | Irish et al. |
| 2008/0122871 A1 | 5/2008 | Guday |
| 2009/0065578 A1 | 3/2009 | Peterson et al. |
| 2009/0271113 A1 | 10/2009 | Chang et al. |
| 2010/0214111 A1 | 8/2010 | Schuler et al. |
| 2010/0268448 A1 | 10/2010 | Doan et al. |
| 2013/0190964 A1 | 7/2013 | Uehara |
| 2013/0245880 A1 | 9/2013 | McQuade |
| 2015/0178985 A1 | 6/2015 | Di Censo et al. |
| 2015/0213555 A1 | 7/2015 | Barfield, Jr. et al. |

FOREIGN PATENT DOCUMENTS

| | | |
|---|---|---|
| WO | 1995005649 | 2/1995 |
| WO | 2002017656 A2 | 2/2002 |
| WO | 2004104968 | 12/2004 |
| WO | 2005/078473 A1 | 8/2005 |

OTHER PUBLICATIONS

SkyTel, SkyTel FleetHawk Technical Specifications (Sep. 15, 2004), available at https://web.archive.org/web/20040915084741/http://www.skytel.com/products/fleethawk_tech_specs.htm (visited Nov. 18, 2015).

SkyTel, SkyTel Product Portfolio (Dec. 12, 2005), available at https://web.archive.org/web/20051212132405/http://www.skytel.com/products/product_portfolio.htm (visited Nov. 16, 2015).

SkyTel, SkyTel: Introducing SkyTel FleetHawk (Dec. 14, 2005), available at https://web.archive.org/web/20051214222815/http://www.skytel.com/products/fleethawk.htm (visited Nov. 16, 2015).

SkyTel, SkyTel Features and Benefits (Nov. 8, 2005), available at https://web.archive.org/web/20051108181656/http://www.skytel.com/products/fleethawk_features.htm (visited Nov. 16, 2015).

SkyTel, SkyTel FleetHawk FAQ (Jan. 25, 2005), available at https://web.archive.org/web/20050125090019/http://www.skytel.com/products/fleethawk_faq.htm (visited Nov. 16, 2015).

SkyTel, SkyTel SkyGuard Home Page (Dec. 14, 2005), available at https://web.archive.org/web/20051214215612/http://www.skytel.com/products/skyguard_home.htm (visited Nov. 16, 2015).

SkyTel, SkyTel SkyGuard Features (Nov. 8, 2005), available at https://web.archive.org/web/20051108181537/http://www.skytel.com/products/skyguard_features.htm (visited Nov. 16, 2015).

SkyTel, SkyTel SkyGuard Application (Nov. 8, 2005), available at https://web.archive.org/web/20051108182655/http://www.skytel.com/products/skyguard_theapplication.htm (visited Nov. 16, 2015).

Teletrac Inc., Fleet Director Enterprise Edition User's Manual, Dec. 23, 2005.

Teletrac Inc., Fleet Director Enterprise Edition Administrator's Manual, Dec. 23, 2005.

Telmap, Telmap Vega Location Management (Oct. 29, 2004), available at https://web.archive.org/web/20041029110610/http://www.telmap.com/asp/products/vega_general.asp?product_id=0#top (visited Nov. 18, 2015).

Telmap, Telmap Case Studies: Road Track S.A.—Telematics Solution (Oct. 29, 2004), available at https://web.archive.org/web/20041029094833/http://www.telmap.com/asp/customers/customers_in.asp?customers_id=25 (visited Nov. 18, 2015).

Telmap, Telmap Case Studies: Partner Communications Company Ltd.—Fleet Management Solution (Oct. 29, 2004), available at

(56) References Cited

OTHER PUBLICATIONS https://web.archive.org/web/20041029090912/http://www.telmap.com/asp/customers/customers_in.asp?customers_id=23 (visited Nov. 18, 2015).

ULocate Communications, Inc., uLocate FleetTracker (Dec. 11, 2004), available at https://web.archive.org/web/20041211213805/http://www.ulocate.com/fleettracker.html (visited Nov. 4, 2015).

ULocate Communications, Inc., uLocate FamilyFinder (Dec. 11, 2004), available at https://web.archive.org/web/20041211220337/http://www.ulocate.com/familyfinder.html (visited Nov. 18, 2015).

ULocate Communications, Inc., uLocate LBS Technology Portfolio (Dec. 12, 2004), available at https://web.archive.org/web/20041212044851/http://www.ulocate.com/technology.html (visited Nov. 18, 2015).

WebTech Wireless, Inc., WebTech Wireless Home Page (Dec. 8, 2004), available at https://web.archive.org/web/20041208102808/http://www.webtechwireless.com/ (visited Nov. 18, 2015).

WebTech Wireless, Inc., WebTech Wireless System Overview (Dec. 8, 2004), available at https://web.archive.org/web/20041208224837/http://webtechwireless.com/products_and_services.htm (visited Nov. 18, 2015).

WebTech Wireless, Inc., WebTech Wireless Vehicle Services (Dec. 12, 2004), available at https://web.archive.org/web/20041212021250/http://www.webtechwireless.com/vehicle_services.htm (visited Nov. 18, 2015).

WebTech Wireless, Inc., WebTech Wireless Networks (Dec. 9, 2004), available at https://web.archive.org/web/20041209120804/http://webtechwireless.com/wireless_networks.htm (visited Nov. 18, 2015).

WebTech Wireless, Inc., WebTech Wireless Quadrant Services Portal (Dec. 9, 2004), available at https://web.archive.org/web/20041209114153/http://webtechwireless.com/quadrant_portal.htm (visited Nov. 18, 2015).

WebTech Wireless, Inc., WebTech Wireless In-Vehicle Hardware (Dec. 9, 2004), available at https://web.archive.org/web/20041209120325/http://webtechwireless.com/vehicle_hardware.htm (visited Nov. 18, 2015).

WebTech Wireless, Inc., WebTech Wireless WebTech 4000 (Dec. 9, 2004), available at https://web.archive.org/web/20041209163147/http://webtechwireless.com/WebTech_4000_Locator.htm (visited Nov. 18, 2015).

WebTech Wireless, Inc., WebTech Wireless WebTech 5000 (Dec. 9, 2004), available at https://web.archive.org/web/20041209110955/http://webtechwireless.com/WebTech_5000_Locator.htm (visited Nov. 18, 2015).

WebTech Wireless, Inc., WebTech Wireless WebTech 4000 Locator (2003).

WebTech Wireless, Inc., WebTech Wireless WebTech 5000 Locator (2004).

WebTech Wireless, Inc., WebTech Wireless Home Page (Dec. 10, 2005), available at https://web.archive.org/web/20051210224632/http://www.webtechwireless.com/ (visited Nov. 16, 2015).

WebTech Wireless, Inc., WebTech Wireless Quadrant Wireless Vehicle Services (Dec. 10, 2005), available at https://web.archive.org/web/20051210230015/http://www.webtechwireless.com/products_and_services.htm (visited Nov. 16, 2015).

WebTech Wireless, Inc., WebTech Wireless Quadrant Services Portal (Nov. 3, 2005), available at https://web.archive.org/web/20051103080818/http://www.webtechwireless.com/quadrant_portal.htm (visited Nov. 16, 2015).

WebTech Wireless, Inc., WebTech Wireless Vehicle Tracking and Communications Platform: The Locator Series, Jan. 1, 2004.

WebTech Wireless, Inc., WebTech Wireless Vehicle Hardware (Nov. 5, 2005), available at https://web.archive.org/web/20051105093318/http://www.webtechwireless.com/vehicle_hardware.htm (visited Nov. 16, 2015).

WebTech Wireless, Inc., WebTech Wireless the Advantages of Wireless Fleet Management (Nov. 3, 2005), available at https://web.archive.org/web/20051103011845/http://www.webtechwireless.com/vehicle_services.htm (visited Nov. 16, 2015).

WebTech Wireless, Inc., WebTech Wireless: Wireless Location Services for Trucking Fleets (2005).

WebTech Wireless, Inc., WebTech Wireless WebTech 4000 Locator, Jan. 1, 2004.

WebTech Wireless, Inc., WebTech Wireless WebTech 5000 Locator, Jan. 1, 2004.

David Weinberger, The Semantic Earth, vol. 22, No. 1, Esther Dyson's Monthly Report, Release 1.0, www.edventure.com (Jan. 28, 2004).

Alen Cohen, Location, Location, Location: uLocate's GPS-based service helps you keep track of family and friends, Internet Business, PC Magazine (Jun. 22, 2004).

Defendants Teletrac Inc. and Navman Wireless North America Ltd's Invalidity contentions, Jan. 1, 2004.

Geotab'S Exhibit D1—012 112 Invalidity Chart, Nov. 20, 2015, filed in the U.S. District Court for the Eastern District of Texas, Marshall Division.

Geotab's Exhibit D2—207 112 Invalidity Chart, Nov. 20, 2015, filed in the U.S. District Court for the Eastern District of Texas, Marshall Division.

Geotab's Exhibit D3—166 112 Invalidity Chart, Nov. 20, 2015, filed in the U.S. District Court for the Eastern District of Texas, Marshall Division.

Geotab's Exhibit D4—499 112 Invalidity Cart, Nov. 20, 2015, filed in the U.S. District Court for the Eastern District of Texas, Marshall Division.

Geotab's Exhibit D5—931 112 Invalidity Chart, Nov. 20, 2015, filed in the U.S. District Court for the Eastern District of Texas, Marshall Division.

Teletrac Inc. et al., "Petition for Inter Partes Review of U.S. Pat. No. 8,223,012", filed on May 19, 2016 with the U.S. Patent Trial and Appeal Board, Case No. IPR2016-01061.

U.S. Patent and Trademark Office, Decision of the Patent Trial and Appeal Board, Institution of Inter Partes Review of U.S. Pat. No. 8,223,012, Case No. IPR2016-01061, pp. 1-13, Dec. 6, 2016.

Teletrac Inc. et al., "Petition for Inter Partes Review of U.S. Pat. No. 8,493,207", filed on May 19, 2016 with the U.S. Patent Trial and Appeal Board, Case No. IPR2016-01062.

U.S. Patent and Trademark Office, Decision of the Patent Trial and Appeal Board, Institution of Inter Partes Review of U.S. Pat. No. 8,493,207, Case No. IPR2016-01062, pp. 1-9, Dec. 6, 2016.

Teletrac Inc. et al., "Petition for Inter Partes Review of U.S. Pat. No. 9,071,931", filed on Jul. 1, 2016 with the U.S. Patent Trial and Appeal Board, Case No. IPR2016-01278.

U.S. Patent and Trademark Office, Decision of the Patent Trial and Appeal Board, Institution of Inter Partes Review of U.S. Pat. No. 9,072,931, Case No. IPR2016-01278, pp. 1-31, Dec. 19, 2016.

Teletrac Inc. et al., "Petition for Inter Partes Review of U.S. Pat. No. 8,717,166", filed on May 19, 2016 with the U.S. Patent Trial and Appeal Board, Case No. IPR2016-01063.

U.S. Patent and Trademark Office, Decision of the Patent Trial and Appeal Board, Institution of Inter Partes Review of U.S. Pat. No. 8,717,166, Case No. IPR2016-01063, pp. 1-31, Nov. 29, 2016.

Teletrac Inc. et al., "Petition for Inter Partes Review of U.S. Pat. No. 9,003,499", filed on May 19, 2016 with the U.S. Patent Trial and Appeal Board, Case No. IPR2016-01064.

U.S. Patent and Trademark Office, Decision of the Patent Trial and Appeal Board, Institution of Inter Partes Review of U.S. Pat. No. 9,003,499, Case No. IPR2016-01064, pp. 1-41, Dec. 5, 2016.

Tellular Corporation, "Second Petition for Inter Partes Review of U.S. Pat. No. 9,071,931", filed with the Patent Trial and Appeal Board Case No. IPR2017-00636, Jan 11, 2017.

Tellular Corporation, "Petition for Inter Partes Review of U.S. Pat. No. 8,149,113" filed with the Patent Trial and Appeal Board Case No. IPR2017-00969, Feb. 28, 2017.

Tellular Corporation, "Second Petition for Inter Partes Review of U.S. Pat. No. 8,223,012" filed with the Patent Trial and Appeal Board Case No. IPR2017-00574, Jan. 4, 2017.

Tellular Corporation, "Second Petition for Inter Partes Review of U.S. Pat. No. 9,003,499" filed with the Patent Trial and Appeal Board Case No. IPR2017-00575, Jan. 4, 2017.

(56) References Cited

OTHER PUBLICATIONS

Tellular Corporation, "Petition for Inter Partes Review of U.S. Pat. No. 9,319,471" filed with the Patent Trial and Appeal Board Case No. IPR2017-00973, Feb. 28, 2017.
Tellular Corporation, "Petition for Inter Partes Review of U.S. Pat. No. 9,485,314" filed with the Patent Trial and Appeal Board Case No. IPR2017-00968, Feb. 28, 2017.
Engadget, 2016, AOL Inc., htttp://www.engadget.com/2005/08/01/yet-another-gps-tracking-system-lets-parents-check-on-kids/ ( visited on Apr. 14, 2016).
Bennett et al., Location-Based Services and the surveillance of Mobility: An analysis of privacy risks in Canada, May 2004 Contributions Program : A Report to the Office of the Privacy Commissioner of Canada, Jun. 2005, University of Victoria, Canada.
Navman OnlineAVL user Manual, May 2005, Navman Wireless.
Biermann, Launch Strategy for a GPS Based Package Tracker Product, Project Submitted for Master of Business Administration of MOT, Summer 2006, Simon Fraser University, Vancouver.
Discrete Wireless home page, Discrete Wireless Inc. (Sep. 18, 2004), available at https://web.archive.org/web/20040918040822/http://www.discretewireless.com/corp (visited Mar. 31, 2016).
@Road—Mobile Resource Management, GeoManager (Jun. 18, 2004), available at https://web.archive.org/web/20040618122542/http://atroad.com/corp/services/geomanager.html (visited Mar. 31, 2016).
Safefreight "how it works", Dec. 6, 2004, available at http://web.archive.org/web/20041206163827/http://www.safefreight-tech.com/how.html (visited Mar. 31, 2016).
Discrete Wireless MARCUS Information: Features and Differentiators (Sep. 15, 2004), available at https://webarchive.org/web/20040915091405/http://discretewireless.com/corp/MARCUS/GPS/Tracking_Information.htm (visited Mar. 31, 2016).
Defendant Geotab Inc.'s Second Supplemental Invalidity Contentions, Apr. 21, 2016, filed in the U.S. District Court for the Eastern District if Texas Marshall Division.
Exhibit B9-1 of Defendant Geotab Inc.'s Second Supplemental Invalidity Contentions, Apr. 21, 2016, filed in the U.S. District Court for the Eastern District if Texas Marshall Division.
Exhibit B9-2 of Defendant Geotab Inc.'s Second Supplemental Invalidity Contentions, Apr. 21, 2016, filed in the U.S. District Court for the Eastern District if Texas Marshall Division.
Exhibit B9-3 of Defendant Geotab Inc.'s Second Supplemental Invalidity Contentions, Apr. 21, 2016, filed in the U.S. District Court for the Eastern District if Texas Marshall Division.
Exhibit B9-4 of Defendant Geotab Inc.'s Second Supplemental Invalidity Contentions, Apr. 21, 2016, filed in the U.S. District Court for the Eastern District if Texas Marshall Division.
Exhibit B9-5 of Defendant Geotab Inc.'s Second Supplemental Invalidity Contentions, Apr. 21, 2016, filed in the U.S. District Court for the Eastern District if Texas Marshall Division.
Exhibit C3-1 of Defendant Geotab Inc.'s Second Supplemental Invalidity Contentions, Apr. 21, 2016, filed in the U.S. District Court for the Eastern District if Texas Marshall Division.
Exhibit C3-2 of Defendant Geotab Inc.'s Second Supplemental Invalidity Contentions, Apr. 21, 2016, filed in the U.S. District Court for the Eastern District if Texas Marshall Division.
Exhibit C3-3 of Defendant Geotab Inc.'s Second Supplemental Invalidity Contentions, Apr. 21, 2016, filed in the U.S. District Court for the Eastern District if Texas Marshall Division.
Exhibit C3-4 of Defendant Geotab Inc.'s Second Supplemental Invalidity Contentions, Apr. 21, 2016, filed in the U.S. District Court for the Eastern District if Texas Marshall Division.
Exhibit C3-5 of Defendant Geotab Inc.'s Second Supplemental Invalidity Contentions, Apr. 21, 2016, filed in the U.S. District Court for the Eastern District if Texas Marshall Division.
Geotab's Initial Invalidity Contentions, Nov. 20, 2015, filed in the U.S. District Court for the Eastern District of Texas, Marshall Division.
Geotab's Exhibit A1—012 Obviousness Citations Chart, Nov. 20, 2015, filed in the U.S. District Court for the Eastern District of Texas, Marshall Division.
Geotab's Exhibit A2—207 Obviousness Citations Chart, Nov. 20, 2015, filed in the U.S. District Court for the Eastern District of Texas, Marshall Division.
Geotab's Exhibit A3—166 Obviousness Citations Chart, Nov. 20, 2015, filed in the U.S. District Court for the Eastern District of Texas, Marshall Division.
Geotab's Exhibit A4—499 Obviousness Citations Chart, Nov. 20, 2015, filed in the U.S. District Court for the Eastern District of Texas, Marshall Division.
Geotab's Exhibit A5—931 Obviousness Citations Chart, Nov. 20, 2015, filed in the U.S. District Court for the Eastern District of Texas, Marshall Division.
Geotab's Exhibit B1-1 Phillips 012 Invalidity Chart, Nov. 20, 2015, filed in the U.S. District Court for the Eastern District of Texas, Marshall Division.
Geotab's Exhibit B1-2 Phillips 207 Invalidity Chart, Nov. 20, 2015, filed in the U.S. District Court for the Eastern District of Texas, Marshall Division.
Geotab's Exhibit B1-3 Phillips 166 Invalidity Chart, Nov. 20, 2015, filed in the U.S. District Court for the Eastern District of Texas, Marshall Division.
Geotab's Exhibit B1-4 Phillips 499 Invalidity Chart, Nov. 20, 2015, filed in the U.S. District Court for the Eastern District of Texas, Marshall Division.
Geotab's Exhibit B1-5 Phillips 931 Invalidity Chart, Nov. 20, 2015, filed in the U.S. District Court for the Eastern District of Texas, Marshall Division.
Geotab's B2-1 Humphries Zou 012 Invalidity Chart, Nov. 20, 2015, filed in the U.S. District Court for the Eastern District of Texas, Marshall Division.
Geotab's B2-2 Humphries Zou 207 Invalidity Chart, Nov. 20, 2015, filed in the U.S. District Court for the Eastern District of Texas, Marshall Division.
Geotab's B2-3 Humphries Zou 166 Invalidity Chart, Nov. 20, 2015, filed in the U.S. District Court for the Eastern District of Texas, Marshall Division.
Geotab's B2-4 Humphries Zou 499 Invalidity Chart, Nov. 20, 2015, filed in the U.S. District Court for the Eastern District of Texas, Marshall Division.
Geotab's Exhibit B2-5 Humphries Zou 931 Invalidity Chart, Nov. 20, 2015, filed in the U.S. District Court for the Eastern District of Texas, Marshall Division.
Geotab's Exhibit B3-1 012 Invalidity Chart (Haney), Nov. 20, 2015, filed in the U.S. District Court for the Eastern District of Texas, Marshall Division.
Geotab's Exhibit B3-2 207 Invalidity Chart (Haney), Nov. 20, 2015, filed in the U.S. District Court for the Eastern District of Texas, Marshall Division.
Geotab's Exhibit B3-3 166 Invalidity Chart (Haney), Nov. 20, 2015, filed in the U.S. District Court for the Eastern District of Texas, Marshall Division.
Geotab's Exhibit B3-4 499 Invalidity Chart (Haney), Nov. 20, 2015, filed in the U.S. District Court for the Eastern District of Texas, Marshall Division.
Geotab's Exhibit B3-5 931 Invalidity Chart (Haney), Nov. 20, 2015, filed in the U.S. District Court for the Eastern District of Texas, Marshall Division.
Geotab's Exhibit B4-1 Zhou 012 Invalidity Chart, Nov. 20, 2015, filed in the U.S. District Court for the Eastern District of Texas, Marshall Division.
Geotab's Exhibit B4-2 Zhou 207 Invalidity Chart, Nov. 20, 2015, filed in the U.S. District Court for the Eastern District of Texas, Marshall Division.
Geotab's Exhibit B4-3 Zhou 166 Invalidity Chart, Nov. 20, 2015, filed in the U.S. District Court for the Eastern District of Texas, Marshall Division.
Geotab's Exhibit B4-4 Zhou 499 Invalidity Chart, Nov. 20, 2015, filed in the U.S. District Court for the Eastern District of Texas, Marshall Division.

(56) References Cited

OTHER PUBLICATIONS

Geotab's Exhibit B4-5 Zhou 931 Invalidity Chart, Nov. 20, 2015, filed in the U.S. District Court for the Eastern District of Texas, Marshall Division.
Geotab's Exhibit B5-1 Staton 012 Invalidity Chart, Nov. 20, 2015, filed in the U.S. District Court for the Eastern District of Texas, Marshall Division.
Geotab's Exhibit B5-2 Staton 207 Invalidity Chart, Nov. 20, 2015, filed in the U.S. District Court for the Eastern District of Texas, Marshall Division.
Geotab's Exhibit B5-3 Staton 166 Invalidity Chart, Nov. 20, 2015, filed in the U.S. District Court for the Eastern District of Texas, Marshall Division.
Geotab's Exhibit B5-4 Staton 499 Invalidity Chart, Nov. 20, 2015, filed in the U.S. District Court for the Eastern District of Texas, Marshall Division.
Geotab's Exhibit B5-5 Staton 931 Invalidity Chart, Nov. 20, 2015, filed in the U.S. District Court for the Eastern District of Texas, Marshall Division.
Geotab's Exhibit B6-1 Elliot 012 Invalidity Chart, Nov. 20, 2015, filed in the U.S. District Court for the Eastern District of Texas, Marshall Division.
Geotab's Exhibit B6-2 Elliot 207 Invalidity Chart, Nov. 20, 2015, filed in the U.S. District Court for the Eastern District of Texas, Marshall Division.
Geotab's Exhibit B6-4 Elliot 499 Invalidity Chart, Nov. 20, 2015, filed in the U.S. District Court for the Eastern District of Texas, Marshall Division.
Geotab's Exhibit B6-5 Elliot 931 Invalidity Chart, Nov. 20, 2015, filed in the U.S. District Court for the Eastern District of Texas, Marshall Division.
Geotab's Exhibit B7-1 012 Invalidity Chart (Sanqunetti), Nov. 20, 2015, filed in the U.S. District Court for the Eastern District of Texas, Marshall Division.
Geotab's Exhibit B7-2 207 Invalidity Chart (Sanqunetti), Nov. 20, 2015, filed in the U.S. District Court for the Eastern District of Texas, Marshall Division.
Geotab's Exhibit B7-4 499 Invalidity Chart (Sanqunetti), Nov. 20, 2015, filed in the U.S. District Court for the Eastern District of Texas, Marshall Division.
Geotab's Exhibit B7-5 931 Invalidity Chart (Sanqunetti), Nov. 20, 2015, filed in the U.S. District Court for the Eastern District of Texas, Marshall Division.
Geotab's Exhibit B8-1 012 Invalidity Chart (Culpepper), Nov. 20, 2015, filed in the U.S. District Court for the Eastern District of Texas, Marshall Division.
Geotab's Exhibit B8-2 207 Invalidity Chart (Culpepper), Nov. 20, 2015, filed in the U.S. District Court for the Eastern District of Texas, Marshall Division.
Geotab's Exhibit B8-3 166 Invalidity Chart (Culpepper), Nov. 20, 2015, filed in the U.S. District Court for the Eastern District of Texas, Marshall Division.
Geotab's Exhibit B8-4 499 Invalidity Chart (Culpepper), Nov. 20, 2015, filed in the U.S. District Court for the Eastern District of Texas, Marshall Division.
Geotab's Exhibit B8-5 931 Invalidity Chart (Culpepper), Nov. 20, 2015, filed in the U.S. District Court for the Eastern District of Texas, Marshall Division.
Geotab's Exhibit C1-1 Checkmate 012 Invalidity Chart, Nov. 20, 2015, filed in the U.S. District Court for the Eastern District of Texas, Marshall Division.
Geotab's Exhibit C1-2 Checkmate 207 Invalidity Chart, Nov. 20, 2015, filed in the U.S. District Court for the Eastern District of Texas, Marshall Division.
Geotab's Exhibit C1-3 Checkmate 166 Invalidity Chart, Nov. 20, 2015, filed in the U.S. District Court for the Eastern District of Texas, Marshall Division.
Geotab's Exhibit C1-4 Checkmate 499 Invalidity Chart, Nov. 20, 2015, filed in the U.S. District Court for the Eastern District of Texas, Marshall Division.
Geotab's Exhibit C1-5 Checkmate 931 Invalidity Chart, Nov. 20, 2015, filed in the U.S. District Court for the Eastern District of Texas, Marshall Division.
Geotab, Inc., Geotab User Guide—Checkmate by Geotab: Fleet Recording, Reporting and Analysis Solution, (Dec. 21, 2005).
Euro Beinat et al., Location services and accuracy: An analysis for field work applications, Gipsy rapport Jul. 2004, versie 1.0 (Jan. 1, 2004).
Anthony LaMarca et al., Place Lab: Device Positioning Using Radio Beacons in the Wild, Intel Research (Oct. 2004).
Business Wire, Air-Trak Adds Geofencing to its Cloudberry Mobile Resource Management System, Business Wire, (Oct. 18, 2004).
ActSoft, Inc., ActSoft Home Page (Dec. 6, 2004), available at https://web.archive.org/web/20051219154509/http://www.actsoft.com/ (visited Nov. 18, 2015).
ActSoft, Inc., ActSoft CometTracker Overview (Dec. 6, 2004), available at https://web.archive.org/web/20041206234939/http://www.actsoft.com/products/tracker.html (visited Nov. 18, 2015).
ActSoft, Inc., ActSoft CometTracker Home Page (Dec. 4, 2004), available at https://web.archive.org/web/20041204133343/http://www.comettracker.com/index.html (visited Nov. 18, 2015).
ActSoft, Inc., ActSoft CometTracker Features (Dec. 4, 2004), available at https://web.archive.org/web/20041204141505/http://www.comettracker.com/overview.html (visited Nov. 18, 2015).
ActSoft, Inc., ActSoft Newsletters (Dec. 6, 2004), available at https://web.archive.org/web/20041206192454/http://www.actsoft.com/aboutus/newsletters.html (visited Nov. 18, 2015).
ActSoft, Inc., CometTracker Newsletter, vol. 1, No. 1 (Dec. 11, 2004), available at https://web.archive.org/web/20041211053724/http://www.actsoft.com/news/GPSNews_v1n1.html (visited Nov. 18, 2015).
ActSoft, Inc., CometTracker Newsletter, vol. 1, No. 2 (Dec. 11, 2004), available at https://web.archive.org/web/20041211054920/http://www.actsoft.com/news/GPSNews_v1n2.html (Nov. 18, 2015).
ActSoft, Inc., CometTracker Newsletter, vol. 1, No. 3 (Dec. 11, 2004), available at https://web.archive.org/web/20041211060420/http://www.actsoft.com/news/GPSNews_v1n3.html (visited Nov. 18, 2015).
ActSoft, Inc., CometTracker Newsletter, vol. 1, No. 4 (Dec. 5, 2004), available at https://web.archive.org/web/20041205012522/http://www.actsoft.com/news/GPSNews_v1n4.html (visited Nov. 18, 2015).
ActSoft, Inc., CometTracker Newsletter, vol. 1, No. 5 (Dec. 5, 2004), available at https://web.archive.org/web/20041205013723/http://www.actsoft.com/news/GPSNews_v1n5.html (visited Nov. 18, 2015).
DriveOK Inc., DriveOK Home Page (Nov. 30, 2005), available at https://web.archive.org/web/20051130020452/http://www.driveok.com/ (visited Nov. 16, 2015).
DriveOK Inc., DriveOK Hardware Details (Jan. 13, 2006), available at https://web.archive.org/web/20060113123629/http://www.driveok.com/theme/see_the_hardware.php (visited Nov. 16, 2015).
DriveOK Inc., DriveOK Software Features (Jan. 13, 2006), available at https://web.archive.org/web/20060113123245/http://www.driveok.com/theme/demo_the_software.php (visited Nov. 16, 2015).
DriveOK Inc., DriveOK Why DriveOK? Page (Jan. 4, 2006), available at https://web.archive.org/web/20060104030753/http://www.driveok.om/theme/why_driveok.php (visited Nov. 16, 2015).
DriveOK Inc., DriveOK FAQ Page (Jan. 13, 2006), available at https://web.archive.org/web/20060113123828/http://www.driveok.com/theme/faq_index.php (visited Nov. 16, 2015).
DriveOK Inc., DriveOK Login Page (Jan. 1, 2006), available at https://web.archive.org/web/20060101055334/http://www.driveok.com/login.php (visited Nov. 16, 2015).
DriveOK Inc., DriveOK Installation and User Manual (Jan. 1, 2005).
FleetBoss Global Positioning Solutions, Inc., FleetBoss Press Release: FleeBoss Autographics Enterprise Edition® Software Enhanced and Improved with New Value-Added Features (Apr. 5, 2004), available at http://www.fleetboss.com/PressRelease20040405.html (visited Oct. 8, 2015).
FleetBoss Global Positioning Solutions, Inc., FleetBoss Report: FleetBoss Autographics Groups Access Feature: A Powerful Pro-

(56) References Cited

OTHER PUBLICATIONS ductivity Tool for Your Business (Mar. 2005), available at https://web.archive.org/web/20060312155359/http://www.fleetboss.com/fleetbossreport0305/groupaccess.asp (visited Oct. 8, 2015).
FleetBoss Global Positioning Solutions, Inc., FleetBoss Press Release: FleetBoss Introduces Series 5500TM (Sep. 12, 2005), available at http://www.fleetboss.com/PressRelease20050912.html (visited Oct. 8, 2015).
FleetBoss Global Positioning Solutions, Inc., FleetBoss Free Cell Phone Messaging!: FleetBoss Offers Free AVL Cell Phone Alerts for Current Users of AVL Monitoring! (Feb. 28, 2005), available at https://web.archive.org/web/20050228060659/http://www.fleetboss.com/fleetbossreport0205/cellphonealertspecial/index.asp (visited Nov. 16, 2015).
GPSTracks LLC, GlobalPetFinder Home Page (Dec. 10, 2005), available at https://web.archive.org/web/20051210144659/http://www.globalpetfinder.com/ (visited Nov. 16, 2015).
GPSTracks LLC, GlobalPetFinder Flow It Works Page (Dec. 13, 2005), available at https://web.archive.org/web/20051213005849/http://www.globalpetfinder.com/howitworks.html (visited Nov. 16, 2015).
GPSTracks LLC, GlobalPetFinder FAQ Page (Sep. 30, 2005), available at https://web.archive.org/web/20050930221449/http://www.globalpetfinder.com/faq.html (visited Nov. 16, 2015).
GPSTracks LLC, GlobalPetFinder Instruction Manual, available from "Activate" at https://web.archive.org/web/20051210144659/http://www.globalpetfinder.com/ (visited Nov. 16, 2015).
ISR FleetTrack, ISR FleetTrack Home Page (Dec. 2, 2004), available at https://web.archive.org/web/20041202093357/http://isrfleettrack.com/ (visited Nov. 18, 2015).
ISR FleetTrack, ISR FleetTrack Overview (Dec. 7, 2004), available at https://web.archive.org/web/20041207034612/http://isrfleettrack.com/overview/overview.html (visited Nov. 18, 2015).
ISR FleetTrack, ISR FleetTrack AVL Overview (Dec. 8, 2004), available at https://web.archive.org/web/20041208102429/http://isrfleettrack.com/overview/aboutavl.html (visited Nov. 18, 2015).
ISR FleetTrack, ISR FleetTrack Products (Dec. 7, 2004), available at https://web.archive.org/web/20041207035739/http://isrfleettrack.com/products/products.html (visited Nov. 18, 2015).
ISR FleetTrack, ISR FleetTrack Vehicle Tracking Hardware (Dec. 14, 2004), available at https://web.archive.org/web/20041214195107/http://isrfleettrack.com/products/hardware.html (visited Nov. 18, 2015).
ISR FleetTrack, ISR FleetTrack Mapping and Tracking Software (Dec. 14, 2004), available at https://web.archive.org/web/20041214195452/http://isrfleettrack.com/products/software.html (visited Nov. 18, 2015).
ISR FleetTrack, ISR FleetTrack Message Log (Dec. 22, 2004), available at https://web.archive.org/web/20041222014146/http://isrfleettrack.com/products/mesgrlog.html (visited Nov. 18, 2015).
ISR FleetTrack, ISR FleetTrack Track Log (Dec. 22, 2004), available at https://web.archive.org/web/20041222014802/http://isrfleettrack.com/products/trklog.html (visited Nov. 18, 2015).
ISR FleetTrack, ISR FleetTrack Communication (Dec. 8, 2004), available at https://web.archive.org/web/20041208104934/http://isrfleettrack.com/products/commun.html (visited Nov. 18, 2015).
ISR FleetTrack, ISR FleetTrack Tour (Dec. 4, 2004), available at https://web.archive.org/web/20041204021613/http://isrfleettrack.com/tour/tour.html (visited Nov. 18, 2015).
ISR FleetTrack, ISR FleetTrack Home Page (Dec. 20, 2005), available at https://web.archive.org/web/20051220114456/http://www.isrfleettrack.com/ (visited Nov. 16, 2015).
ISR FleetTrack, ISR FleetTrack Overview (Dec. 15, 2005), available at https://web.archive.org/web/20051215105435/http://isrfleettrack.com/overview/overview.html (visited Nov. 16, 2015).
ISR FleetTrack, ISR FleetTrack AVL Overview (Dec. 16, 2005), available at https://web.archive.org/web/20051216143826/http://isrfleettrack.com/overview/aboutavl.html (visited Nov. 16, 2015).
ISR FleetTrack, ISR FleetTrack Products (Dec. 14, 2005), available at https://web.archive.org/web/20051214180831/http://www.isrfleettrack.com/products/products.html (visited Nov. 16, 2015).
ISR FleetTrack, ISR FleetTrack Vehicle Tracking Hardware (Dec. 16, 2005), available at https://web.archive.org/web/20051216151202/http://isrfleettrack.com/products/hardware.html (visited Nov. 16, 2015).
ISR FleetTrack, ISR FleetTrack Mapping and Tracking Software (Dec. 16, 2005), available at https://web.archive.org/web/20051216152249/http://isrfleettrack.com/products/software.html (visited Nov. 16, 2015).
ISR FleetTrack, ISR FleetTrack Communication (Dec. 16, 2005), available at https://web.archive.org/web/20051216142348/http://isrfleettrack.com/products/commun.html (visited Nov. 16, 2015).
ISR FleetTrack, ISR FleetTrack Guided Tour (Dec. 15, 2005), available at https://web.archive.org/web/20051215112953/http://isrfleettrack.com/tour/tour.html (visited Nov. 16, 2015).
ISR FleetTrack, ISR FleetTrack News/Press Releases (Dec. 15, 2005), available at https://web.archive.org/web/20051215114411/http://www.isrfleettrack.com/newsinfo/newspr.html#Customer (visited Nov. 16, 2015).
SkyTel, SkyTel Product Portfolio (Dec. 4, 2004), available at https://web.archive.org/web/20041204133254/http://www.skytel.com/products/product_portfolio.htm (visited Nov. 18, 2015).
SkyTel, SkyTel: Introducing SkyTel FleetHawk (Dec. 4, 2004), available at https://web.archive.org/web/20041204131624/http://www.skytel.com/products/fleethawk.htm (visited Nov. 18, 2015).
Adli et al., Defendant LifeViewGPS, Inc.'s Invalidity Contentions, Jan. 19, 2016, US District Court for the Eastern District of California.
Bruce C. Haas et al., Defendants' Motion for Judgment on the Pleadings under Fed. R. Civ. P. 12(c). Feb. 5, 2016, US District Court for the Eastern District of Texas.
Bruce C. Haas et al., Defendants' Motion for Judgment on the Pleadings Pursuant to 35 U.S.C. 112 paragraph 1 and 2, Feb. 8, 2016, US District Court for the Eastern District of Texas.
J. Mark Mann et al., PerDiem's Opposition to Defendants' Motion for Judgment on the Pleadings under Fed. R. Civ. P. 12(c) Feb. 22, 2016, US District Court for the Eastern District of Texas.
J. Mark Mann et al., PerDiem's Opposition to Defendants' Motion for Judgment on the Pleadings Pursuant to 35 U.S.C. 112 paragraph 1 and 2, Feb. 23, 2016, US District Court for the Eastern District of Texas.
Norma N. Bennett et al., Defendant TV Management, Inc. d/b/a GPS North America's Motion for Judgment on the Pleadings under Fed. R. Civ. P. 12(c), Feb. 23, 2016, US District Court for the Eastern District of Texas.
Norma N. Bennett et al., Defendant TV Management, Inc. d/b/a GPS North America's Motion for Judgment on the Pleadings Pursuant to 35 U.S.C. 112 paragraph 1 and 2. Feb. 23, 2016, US District Court for the Eastern District of Texas.
Bruce C. Haas et al.,Defendants' Reply in Support of their Motion for Judgment on the Pleadings Pursuant to 35 U.S.C. 101, Mar. 3, 2016, US District Court for the Eastern District of Texas.
Bruce C. Haas et al., Defendants' Reply in Support of their Motion for Judgment on the Pleadings Pursuant to 35 U.S.C. 112 paragraph 1 and 2, Mar. 4, 2016, US District Court for the Eastern District of Texas.
J. Mark Mann et al., PerDiem's Sur-Reply in Opposition to Defendants' Motion for Judgment on the Pleadings under Fed. R. Civ. P.12(c), Mar. 14, 2016, US District Court for the Eastern District of Texas.
J. Mark Mann et al., PerDiem's Sur-Reply in Opposition to Defendants' Motion for Judgment on the Pleadings Pursuant to 35 U.S.C. 112 paragraph 1 and 2, Mar. 14, 2016, US District Court for the Eastern District of Texas.
J. Mark Mann et al., PerDiem's Opposition to Defendant TV Management's Motion for Judgment on the Pleadings under Fed. R. Civ. P. 12(c), Mar. 14, 2016, US District Court for the Eastern District of Texas.
J. Mark Mann et al., PerDiem's Opposition to Defendant's Motion for Judgment on the Pleadings Pursuant to 35 U.S.C. 112 paragraph 1 and 2, Mar. 14, 2016, US District Court for the Eastern District of Texas.
Sherman et al., Defendant ThingTech, LLC's Invalidity Contentions, Jan. 19, 2016, US District Court for the Eastern District of California.

(56) References Cited

OTHER PUBLICATIONS

United States Patent and Trademark Office, "Decision—Institution of Inter Partes Review of U.S. Pat. No. 9,319,471" Patent Trial and Appeal Board Case IPR2017-00973, Sep. 20, 2017.
United States Patent and Trademark Office, "Decision—Institution of Inter Partes Review of U.S. Pat. No. 9,485,314" Patent Trial and Appeal Board Case IPR2017-00968, Sep. 20, 2017.
United States Patent and Trademark Office, "Decision—Institution of Inter Partes Review of U.S. Pat. No. 8,149,113" Patent Trial and Appeal Board Case IPR2017-00969, Sep. 20, 2017.
Teletrac Inc. et al., "Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1001 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1002 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1003 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1004 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1005 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1006 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1007 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1008 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1009 of Petition for Inter Partes Review of U.S. Pat. No. 8,223,012", filed with the Patent Trial and Appeal Board of the U.S. Patent and Trademark Office, May 19, 2016.
Teletrac Inc. et al. "Exhibit 1010 of Petition for Inter Partes Review of U.S. Pat. No. 8,223,012", filed with the Patent Trial and Appeal Board of the U.S. Patent and Trademark Office, May 19, 2016.
Teletrac Inc. et al., "Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1001 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1002 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1003 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1004 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1005 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1006 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1007 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1008 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1009 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1010 of Petition for Inter Partes Review of U.S. Pat. No. 8,493,207", filed with the Patent Trial and Appeal Board of the U.S. Patent and Trademark Office, May 19, 2016.
Teletrac Inc. et al., "Exhibit 1011 of Petition for Inter Partes Review of U.S. Pat. No. 8,493,207", filed with the Patent Trial and Appeal Board of the U.S. Patent and Trademark Office, May 19, 2016.
Teletrac Inc. et al., "Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1001 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1002 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1003 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1004 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1005 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1006 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1007 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1008 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1009 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1010 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1011 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1012 Petition for Inter Partes Review of U.S. Pat. No. 8,717,166", filed with the Patent Trial and Appeal Board of the U.S. Patent and Trademark Office, May 19, 2016.
Teletrac Inc. et al., "Exhibit 1013 Petition for Inter Partes Review of U.S. Pat. No. 8,717,166", filed with the Patent Trial and Appeal Board of the U.S. Patent and Trademark Office, May 19, 2016.
Teletrac Inc. et al., "Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1001 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1002 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1003 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1004 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1005 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1006 of Petition for Inter Partes Review of U.S. Pat. No. 9,003,499", filed with the Patent Trial and Appeal Board of the U.S. Patent and Trademark Office, May 19, 2016.

(56) References Cited

OTHER PUBLICATIONS

Teletrac Inc. et al., "Exhibit 1007 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1008 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1009 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1010 of Petition for Inter Partes Review of U.S. Pat. No. 9,003,499", filed with the Patent Trial and Appeal Board of the U.S. Patent and Trademark Office, May 19, 2016.
Teletrac Inc. et al., "Exhibit 1011 of Petition for Inter Partes Review of U.S. Pat. No. 9,003,499", filed with the Patent Trial and Appeal Board of the U.S. Patent and Trademark Office, May 19, 2016.
Czarnecka, Marzena, The Long View of the Law, Calgary Company's High-Tech Device Helps Police and Clients "See", Stolen Vehicles and Equipment, Alberta Venture 82-86 (Jun. 2005).
United State Office Action issued in U.S. Appl. No. 14/620,913 dated Apr. 23, 2015.
Amendment/ Req. for Reconsideration After Non-Final Rejection filed in U.S. Appl. No. 14/620,913 dated Apr. 29, 2015.
United State Office Action issued in U.S. Appl. No. 14/629,355 dated May 8, 2015.
United State Office Action issued in U.S. Appl. No. 14/629,347 dated May 5, 2015.
Rachel Gecher : "Keep on Tracking: A wireless fleet tracking system helps put Benson Tank Lines in the driver's seat", Inbound Logistics: Casebook, May 2004, Retrieved from Internet: http://www.inboundlogistics.com/articles/casebook/casebook0504.shtml, the whole document.
Liam Lahey : "Eyes in the sky track street fleet ", IT Business, Computing Canada, Jul. 18, 2003, vol. 29, No. 14, Retrieved from Internet : http://www.itbusiness.ca/index.asp?theaction=61&lid=1&sid=52985, the whole document.
Trina Ogilvie : "Fleet area networks(FANs) driving the uptake of PDAs", Planet PDA Magazine: Handheld Productivity Solutions for the Enterprise, May 13, 2003, Retrieved from Internet: http://www.webtechwireless.com/planetpda.htm, the whole document.
Web Tech Wireless : "The quadrant vehicle services system", Quadrant Vehicle Location System, Retrieved from Internet : http://webtechwireless.com/products_and_services.htm, Aug. 21, 2015, the whole document.
Web Tech Wireless : "Blazing a trail to your bottom line", Quadrant wireless vehicle service, Dec. 8, 2004, Burnaby, BC, Canada, the whole document.
Charles Fishman : "The sky's the limit", Technology, Jun. 30, 2003, the whole document.
Glenn Drexhage : "WebTech rides wireless wave to profitability", Business in Vancouver, Retrieved from Internet : http://www.webtechwireless.com/BIVarticle.htm, Aug. 21, 2015, the whole document.
Webtech Wireless : "Quadrant Fleet management services", WebTech Wireless—GPS Tracking, Retrieved from Internet: https://web.archive.org/web/20040604232817/http://www.webtechwireless.com/ , Aug. 21, 2015, the whole document.
Webtech Wireless : "Webtech wireless adds new landmark tracking functionality to Quadrant service upgrades", WenTech wireless Inc., Retrieved from Internet : https://web.archive.org/web/20040612164517/http://www.webtechwireless.com/investors.htm, Aug. 21, 2015 , the whole document.
Webtech Wireless : "WebTech 4000 Locator", Vehicle Tracking & Communication Platform by WebTech, Jan. 1, 2003, Burnaby, BC, Canada, the whole document.
Acumen Capital Partners : "Webtech wireless Inc.: Wireless Solutions Provide", Acumen Capital Partners Research, May 26, 2003, Calgary,Alberta, Canada, the whole document.
Webtech Wireless : "Wireless Vehicle Services: Experience the 'real-time' power of location, Internet, Communication and Telematics!" , Wireless Global Positioning—GPS, Retrieved from Internet : https://web.archive.org/web/20040612174451/http://www.webtechwireless.com/vehicle_services.htm, Aug. 21, 2015, the whole document.
Webtech Wireless : "The Quadrant Service Portal: Your Online Vehicle Command Center", Wireless Global Positioning—GPS, Reterived from Internet: https://web.archive.org/web/20040614034931/http://webtechwireless.com/quadrant_portal.htm , Aug. 21, 2015 , the whole document.
"Telogis OnTrack." Telogis. Web. Mar. 3, 2005. <http://www.telogis.com/>.
Barkhuus et al., Location-Based Services for Mobile Telephony: a study of users' privacy concerns, Proceedings of Interact 2003, ACM Press, pp. 709-712, Zurich, Switzerland.
Hewlett-Packard Development Copany, Location-based Services, Consumer research findings from HP and Openwave, Mar. 2004, U.S.
Maly et al., A Privilege Management and Enforcement System for Distributed Resource Sharing, 1996.
LifeViewGPS, Inc., Invalidity Contentions, Filed at the US District Court for the Eastern District of Texas, Jan. 19, 2016.
Industrack LLC, Motion for Judgment on the Pleadings under Fed. R. Civ. P. 12(c). Filed at the US District Court for the Eastern District of Texas, Feb. 5, 2016.
Industrack LLC et al., Motion for Judgment on the Pleadings Pursuant to 35 U.S.C. 112 paragraph 1 and 2, Filed at the US District Court for the Eastern District of Texas, Feb. 8, 2016.
Perdiemco LLC, Opposition to Defendants' Motion for Judgment on the Pleadings under Fed. R. Civ. R 12(c) Feb. 22, 2016, US District Court for the Eastern District of Texas.
Perdiemco LLC, Opposition to Defendants' Motion for Judgment on the Pleadings Pursuant to 35 U.S.C. 112 paragraph 1 and 2, Feb. 23, 2016, US District Court for the Eastern District of Texas.
GPS Logic, LLC, et al, Motion for Judgment on the Pleadings under Fed. R. Civ. P. 12(c), Feb. 23, 2016, US District Court for the Eastern District of Texas.
GPS Logic, LLC, et al, Motion for Judgment on the Pleadings Pursuant to 35 U.S.C. 112 paragraph 1 and 2. Feb. 23, 2016, US District Court for the Eastern District of Texas.
Industrack LLC, Reply in Support of their Motion for Judgment on the Pleadings Pursuant to 35 U.S.C. 101, Mar. 3, 2016, US District Court for the Eastern District of Texas.
Industrack LLC et al., Reply in Support of their Motion for Judgment on the Pleadings Pursuant to 35 U.S.C. 112 paragraph 1 and 2, Mar. 4, 2016, US District Court for the Eastern District of Texas.
Perdiemco LLC, PerDiem's Sur-Reply in Opposition to Defendants' Motion for Judgment on the Pleadings under Fed. R. Civ. P.12(c), Mar. 14, 2016, US District Court for the Eastern District of Texas.
Perdiemco LLC, PerDiem's Sur-Reply in Opposition to Defendants' Motion for Judgment on the Pleadings Pursuant to 35 U.S.C. 112 paragraph 1 and 2, Mar. 14, 2016, US District Court for the Eastern District of Texas.
Perdiemco LLC, PerDiem's Opposition to Defendant TV Management's Motion for Judgment on the Pleadings under Fed. R. Civ. P. 12(c), Mar. 14, 2016, US District Court for the Eastern District of Texas.
Perdiemco LLC, PerDiem's Opposition to Defendant's Motion for Judgment on the Pleadings Pursuant to 35 U.S.C. 112 paragraph 1 and 2, Mar. 14, 2016, US District Court for the Eastern District of Texas.
GPS Logic, LLC et al. Defendant ThingTech, LLC's Invalidity Contentions, Jan. 19, 2016, US District Court for the Eastern District of Texas.
Florida Department of Corrections, Global Positioning and Radio Frequency, Oct. 2003.
StreetEagle Version Comparison Chart, https://web.archive.org/web/20041207205210/http://mds-inc.com/StreetEagle_Version_Comparison.htm, Dec. 7, 2004.
Marcus Vehicle Tracking Application User's Guide, Discrete Wireless, Date, www.discretewireless.com.

(56) References Cited

OTHER PUBLICATIONS

GPS Tracking search results, Apr. 14, 2016, The University of Vermont, http://www.uvm.edu/search_results?q_as=GPS%20tracking.
Jeffrey Sanders, "Due Diligence Brings GPS Service Home, Security Systems New", Mar. 9, 2005, https://web.archive.org/web/20050309030521/http://www.securitysystem snews .com/2005.03/depts/m onitor /story1.htm.
SkyBitz How It Works, Oct. 3, 2009, https://web.archive.org/web/20041205151502/http://www.skybitz.com/platform/how it_ works_ html.
Marcus GPS Fleet Management Application User Manual, Aug. 2004, Discrete Wireless Inc.
Joanne Friedrick, "GPS Services, Monitoring Finally on the Map", May 2004, Security Systems News—Source book: Monitoring & GPS.
Rob Goehring, "Locating Value with GPS", Aug. 17, 2005, APT&T News, http:/ /www.sptnews.ca/index.php?option=comcontent&task=view&id . . . .
Erin Zwirn, GPS Locates Signal as a Global Technology, May 2005, Security System News.
Our System, The Technology, and home page of Guardian Mobile Monitoring System (Mar. 6, 2005), available at https://web.archive.org/web/20050306203027/http://www.guardianmms.com/site/our_system/sytem_overview.php (visited Mar. 31, 2016).
Guardian Mobile Monitoring Systems, Inc., An Overview of GPA and the Mobile Security Services Opportunity, 2003, Downloaded Mar. 31, 2016.
The University of Vermont—Vermont Legislative Research Shop:GPS Tracking Applications (Feb. 1, 2005) (downloaded Mar. 31, 2016).
SkyBitz InSight Tracking."Your fleet, always in your line of sight", Jan. 2003, SkyBitz.

Application Launch Screen

Main Screen

Configuration Screen

GPS Screen

Tracking Setup Screen

Log File Selection Screen

Map Screen

Data Screen

Camera Screen

Big Buttons Screen

METHOD FOR CONTROLLING CONVEYANCE OF EVENTS BY DRIVER ADMINISTRATOR OF VEHICLES EQUIPPED WITH ELDS

FIELD OF THE INVENTION

The present invention relates generally to a system and method for defining an event based on the relationship of an object location and a user-defined zone and managing the conveyance of information related to such object location event among computing devices. More particularly, the present invention relates to defining an object location event based on the location of an object relative to a user-defined zone and managing the conveyance of object location event information among computing devices based on user identification codes associated with the computing devices.

BACKGROUND OF THE INVENTION

Various sources of information are available for determining the location of an object. Such location information sources include Global Positioning System (GPS) receivers, radars, radio frequency identification (RFID) tags, and variety of other technologies that can be used to determine location information pertaining to an object, which might be moving or stationary. Such location information has been used to track vehicles, packages, people, etc. and to enable a variety of location aware applications including location aware toll systems, material handling and supply chain management systems, and the like. Thus far, such location aware applications have mostly involved computing devices specifically programmed to provide location-aware functionality in a useful but predetermined manner. For example, scanners have been used as sources of information to convey the locations of shipping containers as they progress through various stages en route to a destination, where the specific location of a given shipping container on a shipping dock or in a cargo hold can be accessed at any given time Technological advancements in computing devices and information networks, in particular wireless networks, have enabled users of a variety of computing devices such as smart phones, personal digital assistants (PDAs), laptop computers, etc. to access and utilize information in more and more locations. For example, such advances now allow users to wirelessly check their email or to surf the Internet from anywhere that is covered by an appropriate data service. Some computing devices have become equipped with technologies that integrate various sources that provide information about the location of the devices. For example, known mobile devices have been equipped with GPS receivers, which enable the users to know where they are located at any given time.

As sources that offer location information become more useful in computing devices and within information networks, there is a need for a system and method that correlates events with location of objects and conveys information about such events to computing devices.

SUMMARY OF THE INVENTION

Briefly, the present invention relates to conveying information relating to an object to one or more users. The invention requires defining a zone by the one or more users. An event is also defined in terms of a condition related to a relationship between an object location and the zone. The condition can relate to entry by the object into the zone, exit by the object from the zone, or proximity of the object to the zone Upon meeting the condition, information regarding the event is conveyed to the at least one of the one or more users. The one or more users can access at least one of the location information, information relating to the zone or conveyed information regarding the event using one or more access control codes. The access control codes can be configured to require multiple levels of access control.

Thus, the present invention relates to a system and method for defining events that are correlated with the location of one or more objects to one or more zones. Hereinafter, such events are referred to as object location events. The object location events can be defined at an application level or a user level. The system and method of the invention also conveys information relating to the object location event to one or more computing devices, which, in an exemplary embodiment of the invention, are associated with corresponding identification codes of one or more users. For example, association of a user identification code with a computing device can be an embedded association (e.g., hard-wired) or it can be based on a user log-in at the computing device. In one embodiment, the object location event relates to information about a location of an object and information about a zone that is defined by a user. The information about the location can be derived from a location information source that is associated with the object. Under this embodiment, the object location event occurs by satisfaction of a defined relationship or condition between the object location information and user-defined zone information. Once the condition is satisfied, information corresponding to the occurrence of the object location event is conveyed to a computing device. In one embodiment of the invention, the information is conveyed to the computing device in accordance with a corresponding user identification code.

In one exemplary embodiment, a user can associate a source of location information with an object and define a zone. Under this arrangement, any other authorized user that has access to information about location of an object and a user-defined zone can also define an object location event for that zone and receive information about occurrence of the event. Under another arrangement, only the user who defines a user-defined zone can define an object location event for that zone.

In a further embodiment, an access code is associated with information about the location of an object. Under this embodiment, the object location information is conveyed to the computing device based upon the user identification code and an access code associated with the location information. Under another arrangement, only the user that associates a source of location information with an object can associate the access code with the object location information as determined by the source of location information.

In yet another embodiment, an access code is associated with the user-defined zone information. Under this embodiment, the user-defined zone information is conveyed to at least one of the computing devices based upon a corresponding user identification code and an access code for the user-defined zone information. Under another arrangement, only the user that defines a user-defined zone can associate the access code with the user-defined zone information.

In still another embodiment, an access code is associated with information about an object location event. Under this embodiment, the information about the object location event is conveyed to at least one of the computing devices based upon a corresponding user identification code and an access code for the object location event information. Under another arrangement, only the user that defines the object location event can associate the access code with the object location event information.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
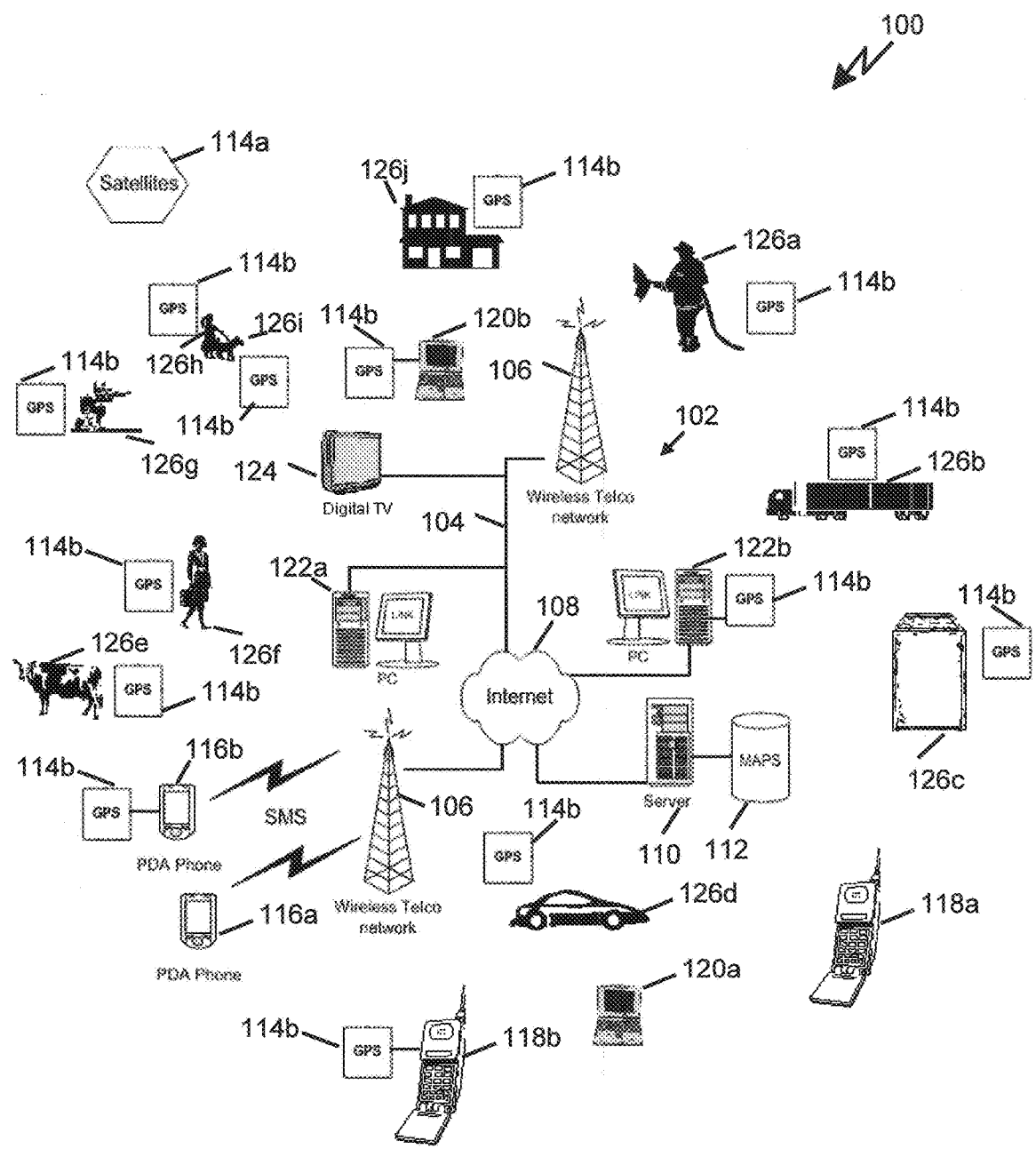
FIG. 1 illustrates an exemplary information-sharing environment including computing devices having wired or wireless connectivity to the Internet and a map server, and various objects for which location information sources provide object location information.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

The present invention provides a system and method for defining an event that relates to a location of an object and managing the conveyance of related information among computing devices associated with corresponding user identification codes. In accordance with the present invention, an information-sharing environment consists of a computing network including a map server and computing devices. Objects associated with sources of location information provide object location information comprising one or more coordinates. In an exemplary embodiment, the coordinates correspond to one or more determined locations of the objects within an established coordinate system. In the system and method of the present invention, an object can comprise any device, thing, person or entity that can be located or tracked. A user of a computing device can retrieve a map, for example, from a map server and define a user-defined zone on the map. According to one aspect of the invention, an object location event is defined based on a relationship between one or more object locations and one or more user-defined zones, where the occurrence of the object location event is determined when a condition associated with the relationship is satisfied. Thus, an occurrence of the object location event is determined based on object location information and user-defined zone information. In other words, an object location event is determined based on the location of an object relative to a user-defined zone. More generally, an object location event may be determined based on the location(s) of one or more objects relative to one or more user-defined zones. Upon occurrence of the object location event, object location event information is conveyed to at least one computing device based upon a corresponding user identification code(s) associated with the computing device(s).

The present invention can be implemented in a variety of information-sharing environments. The sharing of information may be managed among a small number of users such as a family or group of friends, or among a very large number of users such as among employees of very large business, or among a worldwide user base such as a might be provided via an Internet service. Furthermore, information-sharing environments may involve information-sharing environments within information-sharing environments. That is, one or more smaller information-sharing environments may overlap or coexist independent of each other within one or more larger information-sharing environments.

In one embodiment, one or more administrators may be given privileges to configure the information-sharing environment. Such configuration could include specifying authorized users of the environment and their access privileges, etc. Such configuration can also define groups of users as part of an established organizational structure associated with the information-sharing environment. Pre-defined zones comprising domains can be configured along with events that define relationships between object locations relative to such domains. Moreover, sources of publicly available object location information, such as weather tracking systems; can also be configured for use with the system and method of the present invention. Because smaller information-sharing environments can exist within larger information-sharing information environments, various levels of administrator privileges can exist. For example, an Internet service based on the present invention can be provided and administered such that anyone having access to the Internet can purchase the service and be an authorized user. A purchaser of the service can set up a company-wide information-sharing environment within the larger world-wide information-sharing environment that includes company employees, affiliates, Board members, guests, etc. A division within a company may set up its own information-sharing environment, and so on. A family can set up its own information-sharing environment and an individual may set up his or her own information-sharing environment. As such, each information-sharing environment can be administered so as to manage conveyance of information among computing devices based on user identification codes. Management of users, groups, domains, and publicly available object location information sources is described in greater detail below.

Referring to FIG. 1, information-sharing environment 100 includes computing network 102 having wired and wireless network links 104, 106 and connectivity to the Internet 108 that provides access to a map server 110 and map information 112. Also shown are objects associated with sources that provide object location information. Location information sources are shown including Global Positioning System (GPS) satellites 114a and GPS receivers 114b. Examples of various types of computing devices are shown interfacing with the computing network 102 including a PDA 116a, PDA having a GPS receiver 116b, a wireless smart phone 118a, a wireless smart phone having a GPS receiver 118b, a laptop computer 120a, a laptop computer having a GPS receiver 120b, a personal computer 122a, a personal computer having a GPS receiver 122b, and a digital television 124. Typically, one or more of the computing devices could be used as a control station. FIG. 1 also illustrates various examples of objects (e.g., devices, things, people, vehicles, animals, etc.) that can be associated with location information sources enabling object location information to be conveyed to computing devices. Examples of such objects depicted in FIG. 1 include a fireman 126a, semi truck 126b, crate 126c, car 126d, cow 126e, woman 126f, soldier 126g, child 126h, dog 126i, and a building 126j. Generally, any object can be associated with a location information source in accordance with the present invention including the computing devices themselves. Such objects may be outdoors or indoors and may be included within another object such as, for example, a crate 126c within a semi truck 126b. Such objects may be mobile or fixed. At any given time, mobile objects may be moving or stationary. An object may located in any place, or be any thing. Examples of a place, or thing, in accordance with the invention include a restaurant, gas station, destination, airport, hospital, first aid station, hazardous location, vehicle repair shop, shopping mall, museum, park, residence, business, train station, bus station, post office, bank, police station, first station, department store, or storage bin.

Although FIG. 1 depicts a wireless network tower to represent wireless connectivity, any of various well known forms of networking technologies such as WI-FI, Wireless USB, cellular, Bluetooth, optical wireless, etc. can be used alone or in combination to provide the wired and/or wireless connectivity among the computing devices. Furthermore, any of various other location information sources can be used in place of or in combination with GPS to provide object location information. Alternative location information sources include cellular network based wide area location systems, infrared-based location systems, ultrasound-based location systems, video surveillance location systems, RF signal-based location systems such as WLAN-based location systems, ultra wideband location systems, and near field electromagnetic ranging location systems. GPS systems may be augmented using space based augmentation systems (SBAS) and/or local area augmentation systems (LAAS), radar-based information sources, and a data file. GPS systems can be outdoor GPS sources or indoor GPS sources. Alternatives to GPS also include GLONASS and Galileo. Generally, any form of location information system can be used that can provide a coordinate of an object allowing an icon indicating the object location to be depicted on a map.

In accordance with the present invention, the users of the computing devices each have user identification codes that can be associated with the computing devices in order to manage the conveyance of information to the computing devices based upon the identity of the user and information access privileges. Such user identification codes may be managed by a control station or may be established based on user unique user information. Such codes would typically include an identifier (e.g., a user account name or user number) and can be associated with one or more groups, and one or more information access privilege classifications, etc. For example, a given user may be included in a group indicating members of a family, a company, a club, or an association. Similarly, employees of a company may belong to one or more defined groups within the company (e.g., Management, Engineering, Accounting, etc.). Membership within a group may indicate the user can have access to confidential information such as company proprietary information or classified information such as the coordinates of military assets on a battlefield. Access to confidential information may also be based on an access privilege classification, such as a security clearance level. In accordance with the invention, a user's access privileges can change by entering or leaving a domain, for example, the premises of a shopping mall, a particular store within a shopping mall, a museum, a restaurant, an airport, etc. The use of domains in accordance with the present invention is described in greater detail below. Furthermore, user identification codes are typically associated with other user information such as the user name, title, address information, email address, phone numbers, etc. As such, user identification codes can be associated with computing devices and used to manage the conveyance of information among the computing devices. Association of a given user identification code with a given computing device may be via a user login process whereby a user enters a user account name and password. Certain computing devices (e.g., a PDA or smart phone) may allow a user identification code to be embedded or programmed into a computing device's memory such that any user of the computing device is considered to be the user owning the device.

In accordance with the present invention, access codes can be associated with information to manage the conveyance of the information to computing devices. Specifically, an object location information access code can be associated with object location information. A user-defined zone information access code can be associated with user-defined zone information and/or an object location event information access code can be associated with object location event information. These access codes can be used in various ways. In one arrangement, an access code specifies the individual users and/or groups of users having access to the information to which the access code is associated. Such an access code would typically include specific user identification codes and/or group codes. For example, by a user logging into a computing device, a given user identification code is associated with the computing device. The user identification code may also be associated with one or more groups having corresponding group identification codes. The user identification code and group identification code(s) are compared to those included in the access code whereby a match would indicate the user is authorized to receive the information. As such, the information is conveyed to those computing devices that are associated with the users having access to the information as specified by the access code.

Under another arrangement, an access code is assigned to information in the form of a user-defined access code (i.e., a password) that a given user must have knowledge of in order to be granted access to the information. With this approach, the user associating the access code with information defines the user-defined access code and then conveys the user-defined access code to other trusted users to which the user desires to have access to the information. Those trusted users must enter the access code into their computing devices in order to be granted access to the information.

Under still another arrangement, an access code specifies the individual users or groups having access to the information to which the access code is associated provided a given user knows the password. As such, the access code may specify one or more users and/or one or more groups that can enter the appropriate password in order to access the information. With this approach, there are two conditions that must be met to gain access, being included on the access list and having knowledge of the password allowing access to information to be managed by changing the access list and/or changing the password.

Under yet another arrangement, an access code may include a clearance classification code such as Proprietary, Confidential, Secret, Top Secret, etc. These access codes may also specify individual users or groups and may be used with passwords. For example, employees of a company having at least a Secret clearance classification that know the password are provided access to certain information. Generally, many different variations of access code approaches can be used to practice the present invention.

Figure 2:
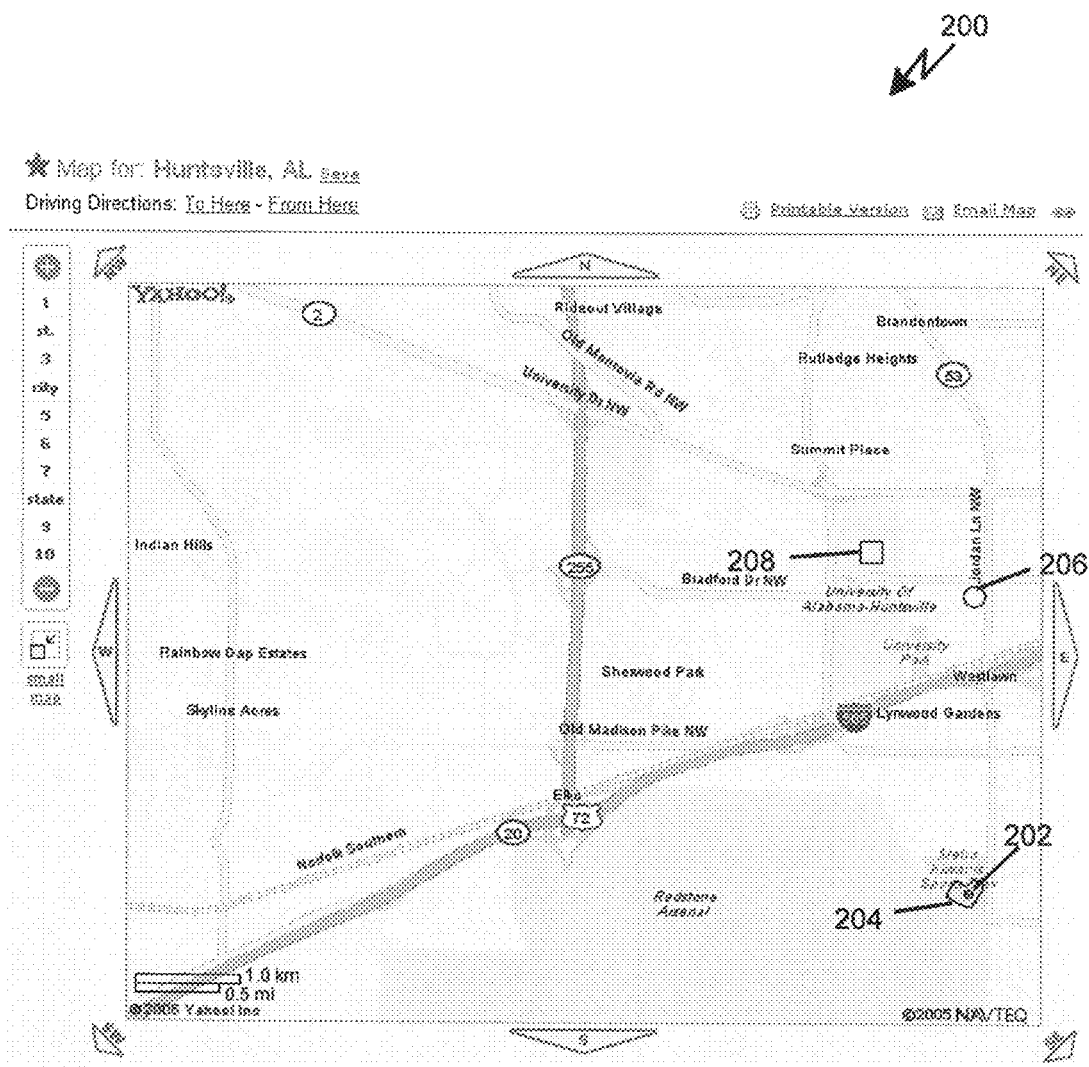
FIG. 2 illustrates an exemplary map retrieved from the map server of FIG. 1 via the Internet that includes an icon indicating a location of a vehicle relative to three user-defined zones.

FIG. 2 illustrates an exemplary map 200 retrieved via the Internet from a map service provider, such as YAHOO!, displayed on a PDA or other computing device. Any map available from any of various map providers via the Internet can be used in accordance with the present invention. Referring to FIG. 2, map 200 depicts an area including a portion of Huntsville, Ala. alongside part of Redstone Arsenal, Alabama. Shown on the map is an icon 202 that indicates the location of a car equipped or somehow associated with a source of location information, such as GPS. The location information source determines the location of the car and conveys the object location information to the computing environment to which the computing device displaying the map is interfaced. Most location information sources include communications capabilities enabling them to convey object location information. Also shown in FIG. 2 are three user-defined zones 204, 206, and 208. Such user-defined zones can be defined using various graphical techniques such as selecting a point and dragging to another point causing a rectangular shaped zone (like 208) to be defined. Alternatively, a point can be selected indicating the center of a circular zone and a dragging action made to define a range of the circular zone (like 206). Various other common drawing techniques such as free form drawing can be used to define a zone not having a basic shape (like 204). Furthermore, non drawing techniques can be employed to define a user-defined zone including use of coordinates stored in a database. For example, the perimeter coordinates of a surveyed property that are stored in a database could be automatically used to define a user-defined zone in accordance with the invention.

In accordance with the present invention, one or more object location events can be defined relating a given user-defined zone to the location of a given object or objects. Occurrence of an object location event can result in generating relevant information (i.e., object location event information) or performing a function (i.e., object location event function). The object location event function can include generating a time/date stamp, send an email, place a call, sound an alarm, etc. Thus, an object location event in accordance with the invention can require the performance or control of a function based on an object location relative to a user-defined zone. An object location event can, for example, be defined to occur when a specific object or any one or more objects enter, leave, or are within a defined proximity of a user-defined zone. An object location event may also be defined to occur periodically as long as an object is outside a user-defined zone or inside a user-defined zone. Alternatively, an object location event may be defined to occur when the location of an object is determined to be within a given proximity of a user-defined zone, for example, within 500 feet of a user-defined zone corresponding to the grounds of a school, a shopping mall, a building, an army base, etc. An event may also be defined to occur when one or more objects or specific objects have entered or exited one or user-defined zones or specific user-defined zones.

Referring again to FIG. 2, an example scenario is described relating the location of the vehicle 202 to the three user-defined zones 204, 206, and 208. The exemplary scenario involves a mother desiring to track the location of a teenage daughter while she drives the vehicle 202. The vehicle 202 is equipped with a location information source (e.g., a GPS receiver) and is configured to transmit the location of the car at some data rate (e.g., transmits location every 5 seconds) when the car is powered on (i.e., car key is in the on position). The mother sets an object location information access code such that only the mother, specifically, a PDA or other computing device used by the mother, has authorized access to the object location information of the vehicle 202. The mother and daughter discuss her scheduled activity for the day and the corresponding travel among different places the daughter plans to go. According to the daughter's schedule, the daughter is to attend a softball game at a local ballpark, have lunch with friends at a local restaurant, and then go to a library on the campus of a local university to do research for a paper.

After discussing the daughter's plans for the day, the mother, using a PDA, retrieves a map and defines the three user-defined zones relating to three locations the daughter is supposed to be at during the day. Specifically, the mother creates the three user-defined zones 204, 206, 208 corresponding to the ballpark parking lot, restaurant, and university library, respectively, and defines object location events for each user-defined zone. For each of the three user-defined zones 204, 206, and 208, the mother defines an object location event where the mother will receive an email indicating the occurrence and time of the object location events, which correspond to when her daughter's car enters or leaves any of the three user-defined zones. The mother defines each of the three 'leaving user-defined zone' object location events such that when they occur they cause her PDA to make a sound (e.g., beep). The user-defined zones and defined object location events allow the mother to know when the daughter has safely arrived at the three places the daughter is to go that day. Furthermore, when the PDA beeps, the mother knows the daughter is in transit and can view the displayed map on the PDA to watch the icon indicating the location of the car as it travels between the user-defined zones or to home. The emails received based on the defined events provide a record of the daughter's entering and leaving the three user-defined zones and can be used to indicate characteristics of movement including the speed of a vehicle.

Figure 3:
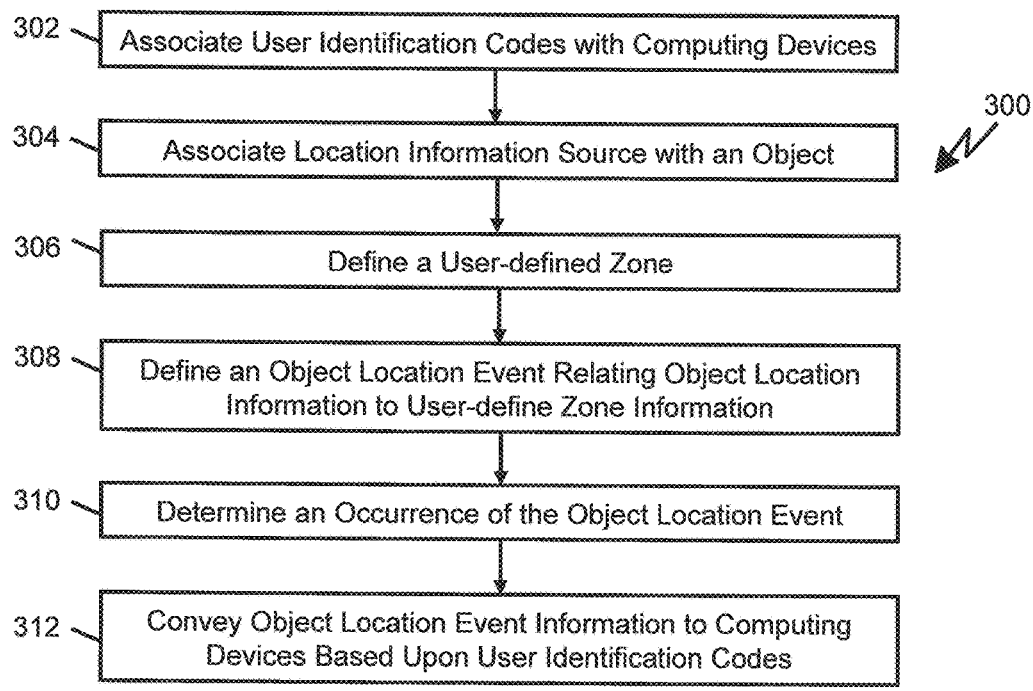
FIG. 3 illustrates a first embodiment of a method of the invention where object location event information is conveyed to computing devices based upon user identification codes.

FIG. 3 illustrates a first embodiment of a method of the invention where object location event information is conveyed to computing devices based upon user identification codes. Referring to FIG. 3, a first embodiment of a method 300 of the invention consists of six steps 302-312. The first step 302 is to associate user identification codes with computing devices. The association can be an embedded association, for example, programming the user identification code in the memory of the computing device, or it can be accomplished via a log-in process at the computing devices using the user identification codes. The second step 304 is to associate a location information source with an object. Such association may involve equipping or attaching the object with or to the source of location information. A third step 306 is to define a zone. The zone can be defined by a user at any time. A fourth step 308 defines an object location event in terms of a relationship between information relating to the object location and user-defined zone. The fifth step 310 is to determine an occurrence of the object location event for example by detecting entry into, exit from or proximity with the user-defined zone. A sixth step 312 is to convey object location event information to computing devices based upon the user identification codes, for example, by sending an e-mail. The step 312 can also involve performing a function such as generating an alarm.

In accordance with one embodiment of the invention, any user can associate a source of location information with an object, define a user-defined zone, and define an object location event. As such, in relation to the example scenario of FIG. 2, steps 304-308 of method 300 are used by the user (i.e., a mother) to associate a GPS device with her daughter's vehicle and define three user-defined zones corresponding to the ballpark parking lot, restaurant, and university library. The user can also define object location events in terms of conditions that relate to entering into, leaving from or being in the proximity of the three user-defined zones. As stated above, upon the occurrence of the object location events, information can be conveyed to the mother's computing device via emails. Occurrence of event can also result in performance of certain functions, e.g., causing the mother's PDA to beep.

In addition to or alternatively to the event information, object location and/or zone information can be conveyed to the computing devices based on user identification codes, which comprise a first level of access control. The conveyance of any one or combination of the foregoing information, i.e., location, zone and/or event, can be to the same users or groups or different users or groups. A second, third, or additional layers of access control can also be applied to any one or combination of the location, zone and/or event information using corresponding access codes as further described below.

Figure 4:
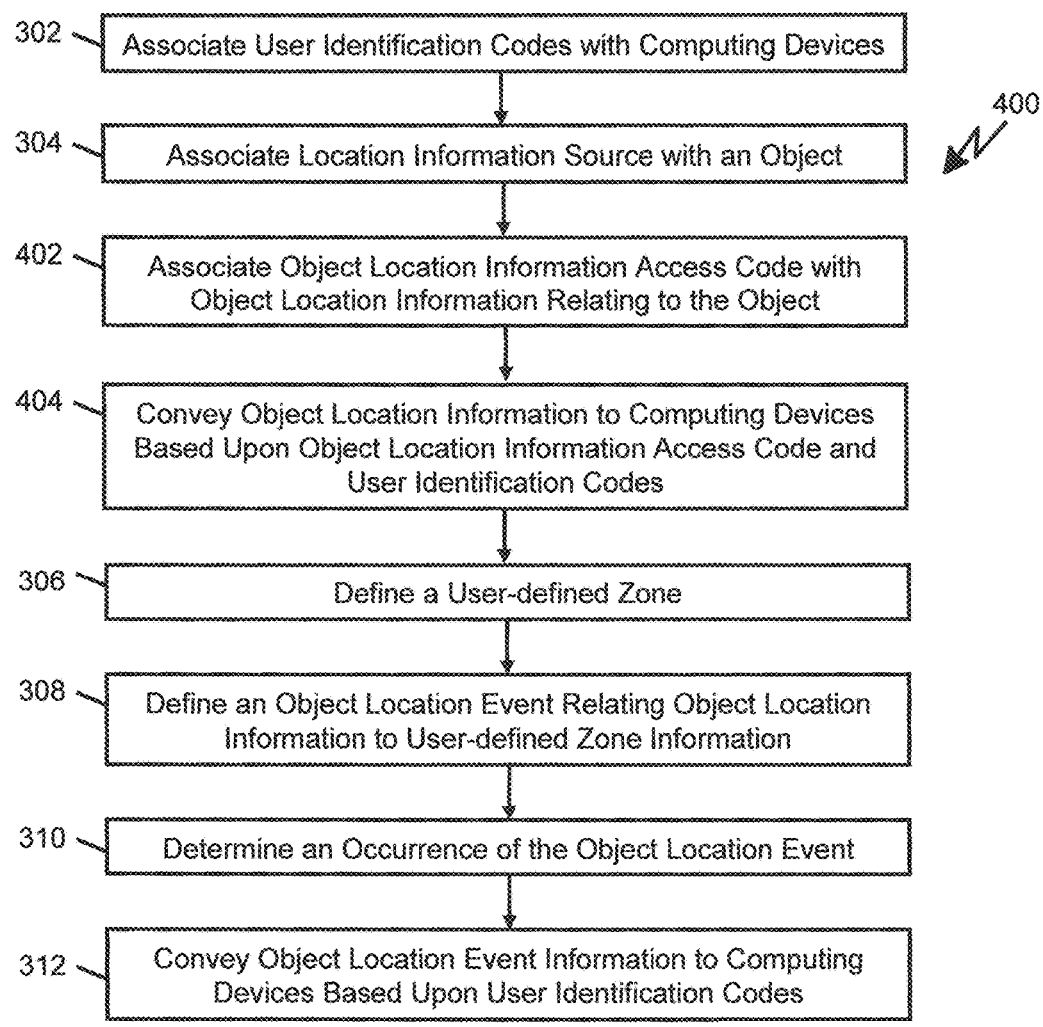
FIG. 4 illustrates a second embodiment of a method of the invention where object location information is conveyed to computing devices based upon an object location information access code and user identification codes, and object location event information is conveyed to computing devices based upon user identification codes.

Referring to FIG. 4, another embodiment of a method 400 of the invention consists of six steps 302-312 of the first method 300 along with two additional steps 402, 404. As with the first method 300, the first two steps 302, 304 of method 400 associate user identification codes with computing devices and associate a source of location information with an object. With method 400, however, the added two steps 402, 404 associate an access code with the object location information and convey the object location information to computing devices based upon the access code of the object location information and user identification codes. The final four steps 306-312 of method 400 are the same as those of method 300, including conveying object location event information to computing devices based upon user identification codes.

Thus, FIG. 4 illustrates an embodiment where the object location information can be accessed by those users that have knowledge of the access code of the object location information. Under this embodiment, the user can give the access code to other trusted users for accessing the location information. Those having the knowledge of access code for the location information may or may not have access to other information such as the zone or event. Alternatively, users may be granted access to the object location information based on the access code without having knowledge of the access code.

In accordance with another exemplary embodiment, any one user can associate a location information source with an object, define a user-defined zone, and define an object location event. The user that associates a location information source with an object can also associate an access code with the object location information provided by the source. As such, in relation to the example scenario of FIG. 2, the mother can facilitate the conveyance of the object location information to another trusted user, who has knowledge of the access code, such as the father of the daughter. The mother may or may not allow conveyance of the zone or event information to the father. Alternatively, a user may be granted access to the object location information based on the object location information access code without having knowledge of the access code.

Figure 5:
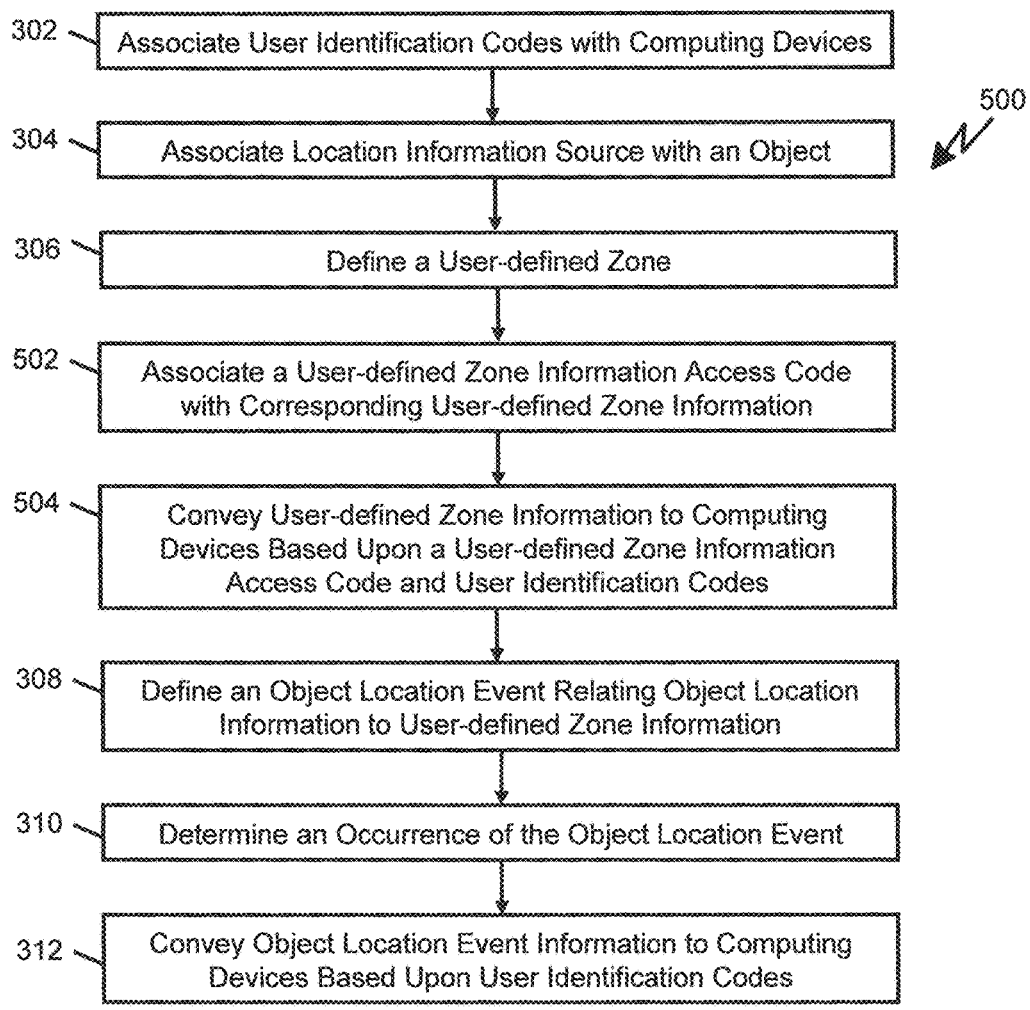
FIG. 5 illustrates a third embodiment of a method of the invention where user-defined zone information is conveyed to computing devices based upon a user-defined zone information access code and user identification codes, and object location event information is conveyed to computing devices based upon user identification codes.

Referring to FIG. 5, a third embodiment of a method 500 of the invention consists of six steps 302-312 of the first method 300 along with two additional steps 502, 504. As with the first method 300, the first three steps 302, 304, 306 of method 500 are to associate user identification codes with computing devices, to associate a location information source with an object, and to define a user-defined zone. With method 500, however, the added two steps 502, 504 also associate an access code with the user-defined zone information. As a result, zone information can be conveyed to the computing devices based upon the access code for the user-defined zone information and user identification codes. The final three steps 308-312 of method 500 are the same as those of method 300, including conveying object location event information to computing devices based upon user identification codes. The event information under this embodiment however may or may be conveyed to those users with knowledge of the user-defined zone information access code. As such, in relation to the example scenario of FIG. 2, the method 500 enables the user (i.e., the mother) to associate a GPS device with her daughter's vehicle, to define three user-defined zones, and to define object location events associated with the three user-defined zones causing, upon the occurrence of the object location events, emails to the sent to the mother and her PDA to beep. By also associating user-defined zone information access codes with the three defined user-defined zones, the mother also enables the user-defined zone information to be conveyed to another user with knowledge of the access code, such as the father of the daughter.

In a further embodiment, steps 402 and 404 of method 400 could also be used with method 500, whereby the user (i.e., the mother) also associates an object location access code with the object location information such that both the mother and father receive the object location information allowing both parents to see the icon indicating the position of the daughter's car in relation to the three user-defined zones. In an alternative embodiment, any user having access to the user-defined zone information is enabled to define an object location event relating object location information to the user-defined zone information. Thus, under one arrangement, only the user who defines a user-defined zone can define an object location event relating to the user-defined zone, while under another arrangement, any user(s) having access to user-defined zone information can define an object location event relating to the corresponding user-defined zone.

Figure 6:
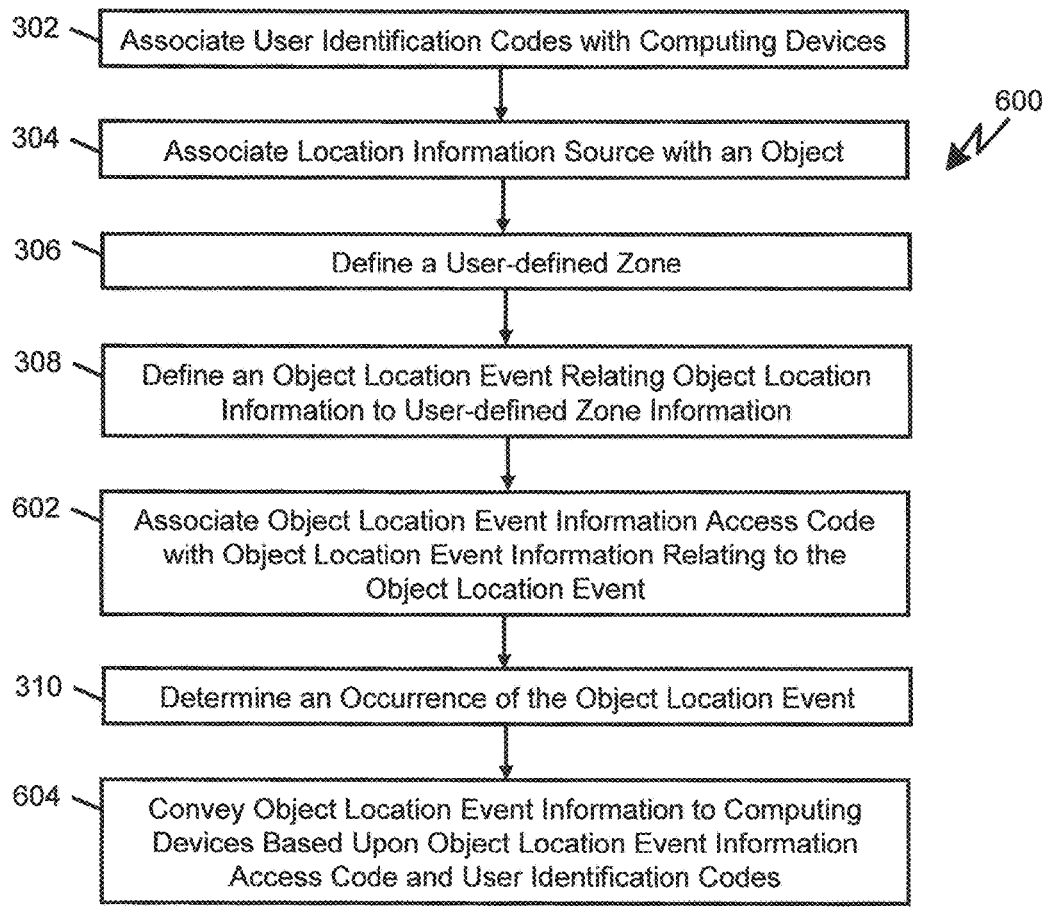
FIG. 6 illustrates a fourth embodiment of a method of the invention where object location event information is conveyed to computing devices based upon an object location event information access code and user identification codes.

FIG. 6 illustrates a fourth embodiment of a method of the invention where object location event information is conveyed to computing devices based upon an object location event information access code and user identification codes. Referring to FIG. 6, a fourth embodiment of a method 600 of the invention consists of five steps 302-310 of the first method 300 along with two additional steps 602, 604. As with the first method 300, the first four steps 302, 304, 306, 308 of method 600 associate user identification codes with computing devices, associate a location information source with an object, define a user-defined zone, and define an object location event in terms of a relationship between object location information and user-defined zone information. With method 600, however, step five 602 associates an object location event information access code with the object location event information relating to the object location event. After step six 310 determines the occurrence of an object location event, step seven 604 conveys object location event information to the computing devices based upon an access code for the object location event information and user identification codes. Thus, by using the object location event information access code, the mother could enable both parents to receive the object location event information corresponding to the object location events defined by the mother. In other words, both parents could receive emails indicating when the daughter entered or exited one of the three user-defined zones. In accordance with a preferred embodiment of the invention, the user that defines object location events can also associate access code for information that correspond to object location events. By also associating object location event information access codes with the defined object location events, the mother can enable the object location event information to be conveyed to another user with knowledge of such access code, such as the father of the daughter. Thus, with the method 600 in relation to the example of FIG. 2, the father would receive the object location event information but may or may not receive object location information or user-defined zone information.

In an alternative arrangement, steps 502 and 504 of method 500 could also be used with method 600 whereby a user (e.g., the mother) also associates an access code with the user-defined zone information for conveyance to another user with knowledge of such access code (e.g., the father). Under such an alternative arrangement, the object location event can be defined by any user(s) having access to the user-defined zone information or only the user that defined the user-defined zone. In either case, only the user that defines an object location event can associate an object location event information access code with object location event information corresponding to the object location event.

Figure 7:
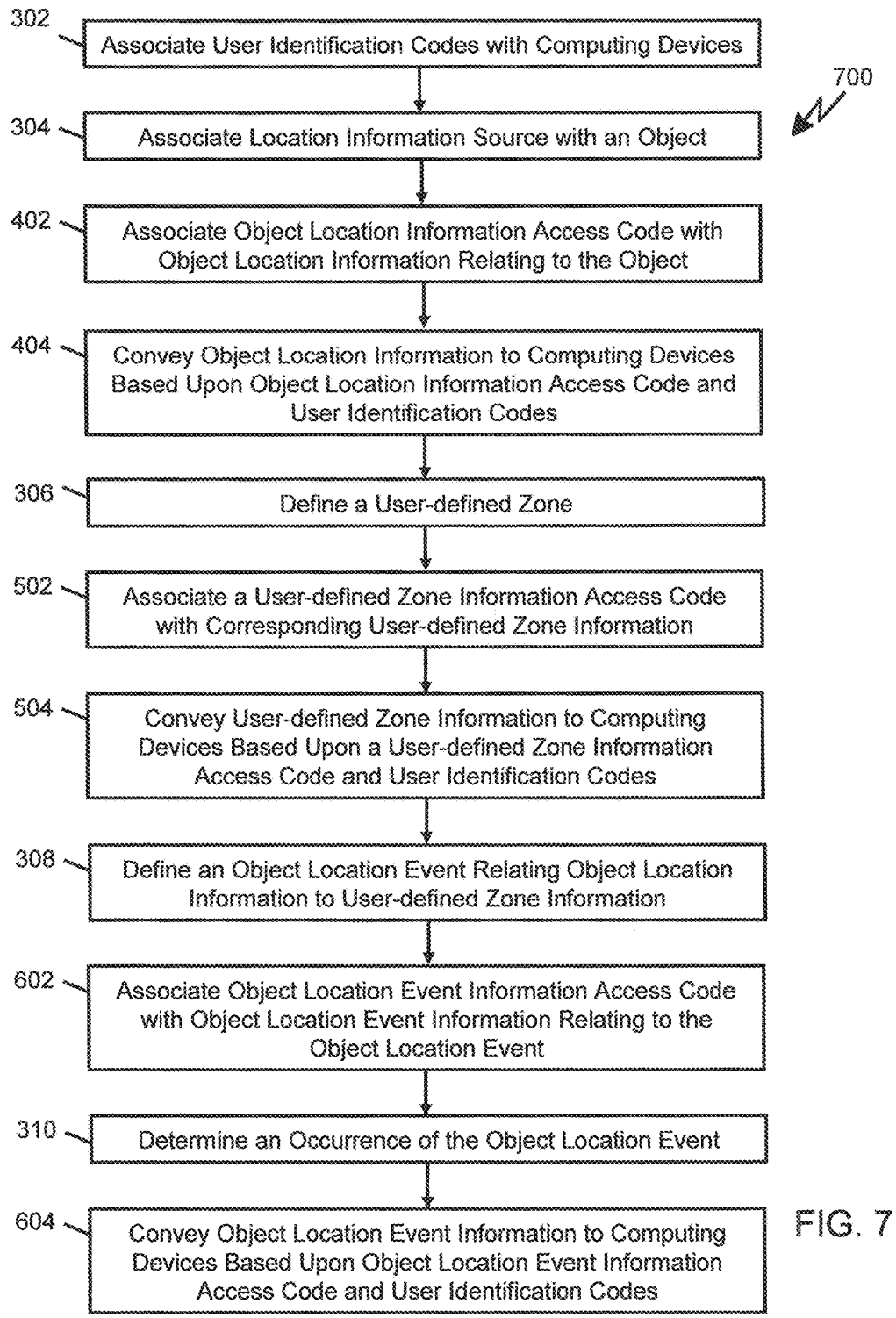
FIG. 7 illustrates a fifth embodiment of a method of the invention where object location information are conveyed to computing devices based upon an object location information access code and user identification codes, user-defined zone information is conveyed to computing devices based upon a user-defined zone information access code and user identification codes, and object location event information is conveyed to computing devices based upon an object location event information access code and user identification codes.

FIG. 7 illustrates a fifth embodiment of a method of the invention where object location information is conveyed to computing devices based upon an object location information access code and user identification codes, user-defined zone information is conveyed to computing devices based upon a user-defined zone information access code and user identification codes, and object location event information is conveyed to computing devices based upon an object location event information access code and user identification codes. Referring to FIG. 7, in the method 700, the steps of method 600 are again used with the addition of the two steps 402, 404 of method 400 and the two steps 502, 504 of method 500. With these additional four steps, when referring to the example of FIG. 2, the mother could associate object location information access codes and user-defined zone information access codes with object location information and user-defined zone information, respectively, in such a way as to allow both parents to receive emails, beeps, and view the movement of the daughter's car using their respective PDAs.

In accordance with the present invention, an administrator of an information-sharing environment maintains a database of user information for those having access to the information-sharing environment. Such a database can be maintained on a central or distributed control station that may be a company's computer server or on an individual's personal computer. Information maintained for a user typically includes a user account name and password and a user identification code, and may include a variety of information about the user including the user's name, address, phone number(s), email address(es), company name, title, birth date, etc. A user may be given access privileges to certain classes of information based on the user's position or role within a company or family, a Government security clearance, and/or for other reasons deemed appropriate for a given information-sharing environment.

An administrator can define one or more groups to which a given user can be associated. Groups may be defined in accordance with an organizational structure or hierarchy. For example, an administrator for an information-sharing environment corresponding to a company may define groups for the various organizations within the company, such as legal, accounting, shipping, etc., and for groups of users not based on organization, such as executive, management, administrative, exempt employees, non-exempt employees, etc. After a group has been defined, the administrator can associate individual users with one or more of the defined groups. Similarly, a parent administering an information-sharing environment might define groups such as parents, teenagers, children, drivers, and so forth. Information maintained for a group typically includes a group name and group identification code, and may include a variety of information about the group including the group's address, phone number, email address, website, point-of-contact, etc. As such, a user may be associated with one or more groups defined by an administrator of an information-sharing environment.

In accordance with the present invention, any user can define a group, for example, a group of friends, a study group, etc. Information for such user-defined groups may be maintained in a central database or may be maintained on an individual user's computer. As such, knowledge of the defined group may be available to other users of an information-sharing environment or may be maintained solely for an individual user's benefit.

In accordance with the present invention, one or more location information sources can be associated with an object to provide object location information consisting of a one or more coordinates corresponding to one or more determined locations of the object within an established coordinate system. In accordance with the invention, one or more coordinate systems can be established by an administrator to describe object locations within an information-sharing environment. The coordinate system may be established to accommodate the coordinate system used by any suitable map service. A typical coordinate system is known as the latitude, longitude, and height system. Alternative coordinate systems include the Earth Centered, Earth Fixed Cartesian (ECEF X-Y-Z) coordinate system, Universal Transverse Mercator (UTM) coordinate system, Military Grid Reference System (MGRS), World Geographic Reference System (GEOREF), Universal Polar Stereographic projection (UPS), national grid systems, state plane coordinates, public land rectangular surveys, metes and bounds, etc. A coordinate system may also be established corresponding to a domain, for example, an office building or a shopping mall. Additionally, one or more users may define a coordinate system for example, making the location of a user's home or business or a user's own location the (0,0) reference point within an X-Y coordinate system. As such, computing devices used in accordance with the invention may include means for translating between coordinate systems. Coordinate systems may be based upon the location information source(s) used. For example, a GPS receiver location information source may be placed at a location, for example the entry door of a building, and its GPS location in latitude and longitude and height used as a (0,0,0) reference point for a coordinate system used inside the building along with a second location information source such as UWB system better suited for indoor operation. As such, one or more coordinate systems established by an administrator or by a user of an information-sharing environment can be used to provide object location information.

In accordance with the present invention, when a user associates multiple location information sources with an object, the user can determine whether or how the object location information is used (e.g., combined). In particular, the user can determine how handoffs are to occur between location information sources such as switching among available GPS satellites based on received signal strength or switching between a GPS and UWB system when a user goes indoors, which might be based on loss or degradation of a GPS signal. Handoff among location information sources can be based upon object location information.

In accordance with the present invention, a user that associates an information location source with an object can determine how often object location information is updated. Under one arrangement, the user can determine the rate at which object location information is provided. Under another arrangement, object location information may be provided by the location information source at a certain rate which the user may select as the appropriate update rate or the user may select to update object location information less often or to only maintain (or use) the current object location information. Depending on whether object location information is being logged (i.e., stored) and/or conveyed to other users, decisions concerning the update rate typically involve a tradeoff of available storage capabilities (e.g., in memory, to a physical storage media, etc.) versus granularity of stored object location information and resulting accuracy of its display on a map. For example, object location information stored in a log file once every 5 seconds would allow a more accurate display of the movement of a vehicle than object location information stored once per minute, but the once per 5 second update rate requires twelve times the storage space compared to the space required to store object location information once per minute. When only maintaining the current object location information, the same memory/storage location can be repeatedly rewritten. The selected update rate also determines how often the object location information can be conveyed to users. The user can also determine whether a time stamp is associated with each update to indicate the actual time that an object was at a given location.

As previously described, the user that associates an information location source with an object can also associate an object location information access code with the object location information provided by the information source and can thereby manage the conveying of the object location information to one or more users. As generally described above, an object location information access code can specify individual users or groups allowed access to the object location information, may specify a password a user must know to receive access to the object location information, and/or may include a clearance classification code. As such, the object location information access code determines which user(s) are conveyed the object location information.

In accordance with the present invention, a user that associates an information location source with an object can determine whether to store object location information in a log file, which can be played back. The storage of object location information to a log file may be the result of the occurrence of a defined object location event. For example, a user could define two zones, a first object location event that starts logging object location information when an object exits the first zone, and a second object location event that ends the logging of object location information when the object enters the second zone, thereby allowing the movement of the object between the two zones to be reviewed at a later time. Alternatively, object location information may be provided by a simulation. For example, military officers could define battle plans based upon movement of personnel and equipment having location information sources into and out of defined zones and corresponding object location events. For training purposes, the movement of personnel and equipment could be produced by a simulation that inputs the object location information into the information sharing environment allowing the military officers to react by changing plans, defining new zones, new object location events, etc. Furthermore, object location information may be provided by emergency information sources, which might indicate the location of a fire, flood, earthquake, bridge out, etc. or by weather information sources, which might indicate the location of a severe thunderstorm, tornado, winter storm, hurricane, etc.

In accordance with the present invention, object location information and zone information is displayed on a map received from a map information source. In the example described previously in relation to FIG. 2, a map from an Internet map service was used that shows the streets of the city of Huntsville, Ala. at an appropriate scale for illustrating the movement of the daughter among three locations in the city. Under one scenario, a user could zoom in or out from a street scale to a world scale. Generally, any electronic map can be used in accordance with the present invention as appropriate to meet the informational requirements of the users involved. Furthermore, multiple maps can be used allowing different levels of scale as appropriate for the requirements of the user(s) involved in the sharing of information. A world map might be used, for example, that enables the locations of ships traveling to and from user-defined zones associated with various ports around the world to be displayed. A map of an amusement park might be used by a family visiting the park. A map may correspond to the inside of a building such as an office building or a shopping mall. A map may correspond to a battlefield. As such, map information corresponding to a given electronic map would be accessible to the computing devices of the information sharing environment receiving object location information, zone information, and/or object location event information that is to be displayed on the map. However, certain types of devices may be included in the information sharing environment that do not have the ability to receive or display a map but that can receive useful object location information, zone information, and/or object location event information, nonetheless. For example, an expecting woman might define a zone around her hospital and an object location event causing her Blackberry to call her sister's cellular telephone when her car enters the zone telling her that she has safely arrived at the hospital to deliver her baby.

Various commonly used map display management techniques can be employed in accordance with the present invention. For instance, an automatic zoom level selection scheme may be established where the zoom level defaults to the closest in level that can display all user-defined zones. An automatic centering approach might set the center of the map to correspond to the location of a given object such as the current location of a user or to the average location of multiple objects. Icons can be set to flash to indicate movement or non-movement of an object. Colors of lines or areas indicating a zone may change when an object has entered or exited the zone. Such map display management techniques may be controllable by an administrator and/or by individual users.

In accordance with the present invention, a user can define a user-defined zone on a map that can then be used to define an object location event relating object location information to user-defined zone information. A user-defined zone can be defined graphically using various techniques such as selecting a point and then dragging to another point to define either a rectangular shaped zone or a circular zone, drawing a zone by freehand to create a zone having an oddly shaped boundary, etc. As such, a user-defined zone has a boundary that can be specified in accordance with an established coordinate system. Typically user-defined zone information maintained for a user-defined zone includes a zone identification code and its boundary coordinates and may include a zone name, a zone security level, a zone danger level, etc. Generally, a user that defines a zone can associate zone information with the zone that can be conveyed to other users.

As stated above, a user that defines a zone can also associate a zone information access code with the user-defined zone information corresponding to the user-defined zone and can thereby manage the conveying of the user-defined zone information to one or more users. As generally described above, a user-defined zone information access code can specify individual users or groups allowed access to the user-defined zone information, may specify a password a user must know to receive access to the user-defined zone information, and/or may include a clearance classification code. As such, the user-defined zone information access code determines which user(s) are conveyed the user-defined zone information.

In accordance with the present invention, a user can define an object location event relating object location information to user-defined zone information. An object location event may be something that is to occur whenever a specific object enters and/or leaves a specific user-defined zone or an object location event may be something that is to occur whenever an object is or is not within a specified proximity of a user-defined zone. Under one aspect the invention, the occurrence of an object location event results in the conveyance of object location event information which includes object location information and user-defined zone information. Typically, object location event information maintained for a defined object location event includes an object location event identification code and may include an object location event name, a time stamp, an object location event security level, an object location event danger level, etc. Generally, a user that defines an object location event can associate object location event information with the object location event that can be conveyed to other users. Under another aspect of the invention, the occurrence of an object location event results in performance of a function, including the control of a device such as a camera, motion sensor, garage door, web cam, lighting device, etc.

In accordance with the present invention, a user that defines an object location event can also associate an object location event information access code with the object location event information corresponding to the object location event and can thereby manage the conveying of the object location event information to one or more users. As generally described above, an object location event information access code can specify individual users or groups allowed access to the object location event information, may specify a password a user must know to receive access to the object location event information, and/or may include a clearance classification code. As such, the object location event information access code determines which user(s) are conveyed the object location event information.

An important distinction exists between the user-defined zones and object location events of the present invention, and predefined zones (or domains) and predefined object location events that have previously been used in location-aware applications. Predefined zones are used to provide location-aware functionality in a useful but predetermined manner where users of computing devices within the information sharing environment do not define the domain(s) or the events that occur as objects enter or leave the domains. A predefined zone may be a house, a room, a business perimeter, or a predefined area within a much larger area. One or more events involving the location of objects relative to the predefined zone is predetermined. The user of the computing devices in prior art shared information environment participates but does not otherwise control or manage the conveyance of information, which has all been predetermined. For instance, an alarm condition may be set when a person carries an object having a non-deactivated RFID tag into a predefined zone about an exit to a store whereby the alarm condition causes a recorded warning message to play on a loudspeaker. A motion detector may detect a person walking through a predefined area near a building and turn on a light. Kiosks within a zoo may interact with individuals carrying tracking devices that enter predefined areas about the kiosks. A super mall, itself a domain, may be subdivided into its tenant stores or even departments within stores, each a separate domain, and customers carrying tracking devices may be offered specials as they move about the mall.

The user-defined zones of the present invention can be defined by any user of the information sharing environment. User-defined zones can be used in conjunction with domains. For example, three teenage girls, each carrying a smart phone with a location information source, go to a mall where each of the three girls is a member of the mall's interactive shopping club. As they enter the mall, their smart phones automatically interface with the information sharing environment available within the mall. Their phones load the mall's map and begin to indicate their locations within the mall. The girls decide to split up and meet later at their favorite hangout spot within the mall, which is a sitting area near an escalator. One of them defines a user-defined zone on the mall's map corresponding to the sitting area and an object location event whereby the smart phones are sent an email and caused to beep when any of the girls enters the sitting area. They then split up to do some shopping. As they walk about the mall, they walk near kiosks that recognize their presence within predefined areas within the mall (via the smart phones) and the kiosks provide personalized specials such as, "Cindy. Your favorite pre-washed jeans are 30% off!" When one of the girls finishes shopping, and goes to the sitting area, the other two girls are automatically emailed and their phones beep so that they know to go meet their friend at the sitting area. With this example, the user-defined zone (i.e., the sitting area) and the object location event (i.e., the emails/beeps) were not predefined as were the personalized specials provided by the kiosks as the girls walked into predefined zones.

Thus, a key distinction between the user-defined zones of the present invention and predefined zones of previous location-aware applications is that the occurrence of object location events and the management of the conveyance of object location event information is determined by the user of the computing device and not by someone else. Take for example, a traveling salesman who wants to make his day more efficient. In accordance with the present invention, prior to venturing out on the road, the salesman determines the nine sales calls he intends to make for the day and defines a user-defined zone about each sales call location. For each user-defined zone he defines object location events related to the location of his car and each zone. The time he enters or leaves each zone is to be recorded and, as he enters each zone, his PDA is to automatically receive the latest, up-to-the-minute customer information maintained by his sales office. For all but his last sales call he defines an object location event for when he leaves the corresponding zone to email his next sales call to let them know that he's en route to their business. The email sent when leaving his fourth call specifically mentions he'll be arriving in about one hour that is to include a lunch break. He also defines an object location event to email his wife letting her know the time when he leaves the zone corresponding to his last sales call thus allowing her to better plan her evening.

In accordance with the present invention, information packages can be associated with object location information, user-defined zone information, and/or object location event information where an information package may include a picture, movie, audio file, document, and/or data file. The information packages may include sensor information received from one or more sensors including those sensors that measure a characteristic of a physical environment, such as temperature, humidity, radioactivity, etc. and/or sensors that measure physical characteristics, such as heart rate, breathing rate, etc. At least one time stamp may be associated with an information package indicating the timing of the information included in the package, for example, the times when pictures were taken or sensor measurements were made. Under one arrangement, any user can associate an information package with object location information, user-defined zone information, and/or object location event information.

In accordance with the present invention, a user that associates an information package with object location information, user-defined zone information, and/or object location event information can also associate an information package access code with the information package and can thereby manage the conveying of the information package to one or more users. As generally described above, an information package access code can specify individual users or groups allowed access to the information package, may specify a password a user must know to receive access to the information package, and/or may include a clearance classification code. As such, the information package access code determines which user(s) are conveyed the information package.

Generally, the present invention enables any user of a multiple user computing environment to define object location events relating object location information to user-defined zones and to manage to conveyance of object location event information based on user identification codes. By also using access codes, multiple users can collaboratively define and manage events and manage the conveyance of corresponding object location information, user-defined zone information, and/or object location event information among computing devices. Moreover, the present invention provides a system and method for generating user-defined location aware applications. Described below are four examples of such user-defined location aware applications that are supported by the present invention.

Parole Officer Support

Parolees have associated with them a location information source. A parole officer can, on a case-by-case basis, identify good locations and bad locations for parolees and define object location events for entering such good and bad locations causing him to be notified of a given parolee visiting the locations.

Pet Tracking

A pet has associated with it a location information source. The pet owner defines zones that the pet is supposed to stay in (e.g., a yard) and may define zones in which the pet is not allowed (e.g., a garden). An object location event for leaving the yard sends an email and phones the pet owner. An object location event for entering the garden might cause a siren to go off to scare the pet.

Child Tracking

A child has associated with it a location information source. A parent identifies zones in the neighborhood where the child is allowed to play and explicitly not allowed to play. Object location events are defined where the parent is emailed or otherwise notified as the child moves about the neighborhood.

Hiking

Several hikers have associated with them location information sources. The hiking trail as indicated on a map includes user-defined zones corresponding to key locations along the route. Object location events are defined such that each hiker receives an email on their smart phone whenever another hiker enters or exits a zone.

The present invention is implemented by a Location and Tracking software that executes on PDAs, telephones, and personal computers. The Location and Tracking software is used for tracking the location of a user whereby user location information is conveyed to contacts based upon the location of the user relative to one or more zones defined by the user. As such, user location information described below corresponds to object location information generally described above.

The Location and Tracking software is typically used in the LOCATION mode. This means that a GPS connection is active and a polling rate is set to periodically send location packets indicating the location of the user to a central database. If a user sets TRACKING to OFF, location packets only update the current location record. If TRACKING is set to ON, location packet are saved in individual records that can be displayed as a 'Mapped Track' on a user's PDA, Phone, or PC.

Current and prior user location information for one or more users can be conveyed to one or more users having access privileges to the user location information for display on the one or more users' computing device(s). The current position of a given user is indicated by a black square. As such, as the user moves, black squares indicate the current and past location of the user thereby showing the movement or path of the user.

Zones comprise geographic boundaries. If the GPS receiver indicates a user's location passes over a zone boundary, an exit or entry alert is issued. A notification is sent to one or more individuals as defined when the zone is created. Different types of zones can be created with each zone type causing different types of information to be conveyed when a user's location enters, exits, and/or is within a zone. Codes associated with the zones determine which users receive location information. As such, the codes associated with the zones correspond to the zone information access codes and object location event information access codes described generally above. Specifically, by sharing the Phone number and Code other users can 'load' the zone into their device and it will respond with alerts to the defined addressees thereby enabling group tracking and location management.

Figure 8:
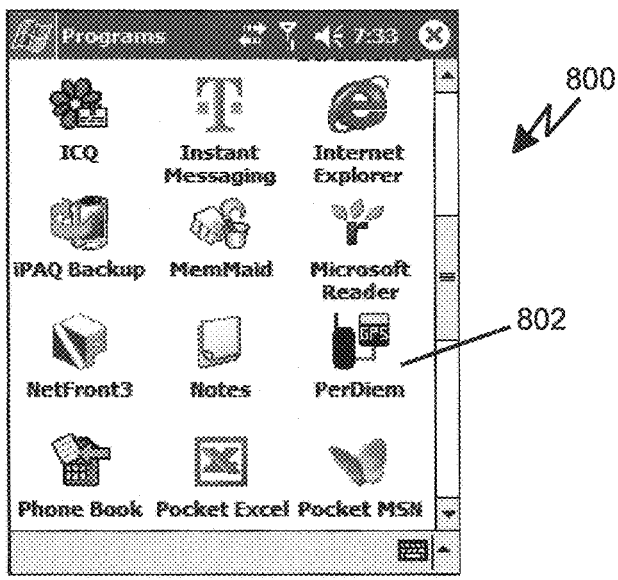
FIG. 8 illustrates an exemplary PDA Application Launch Screen used to begin execution of a Location and Tracking software as implemented according to the present invention.

FIG. 8 illustrates an exemplary PDA Application Launch Screen 800 used to begin execution of the Location and Tracking software. Referring to FIG. 8, a PDA application launch screen 800 typically includes various icons corresponding to programs available for execution such as the Location and Tracking software icon 802. When a user selects the Location and Tracking software icon 802, the Location and Tracking software is executed.

Figure 9:
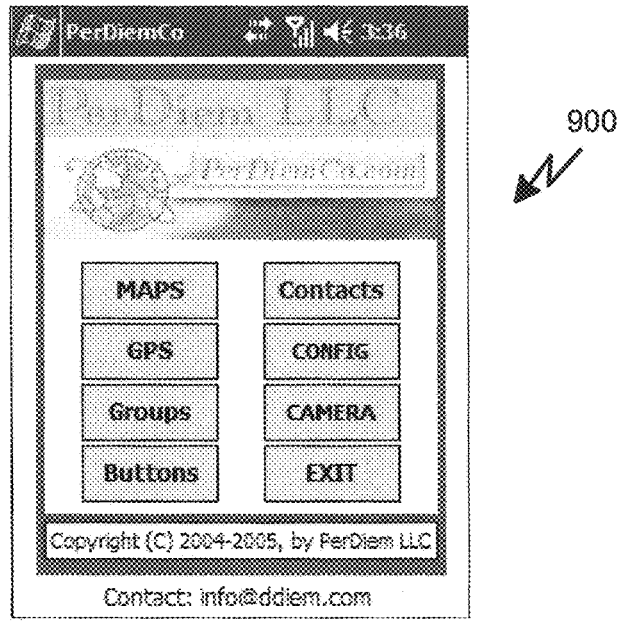
FIG. 9 illustrates an exemplary Main Screen of the Location and Tracking software from which additional screens are accessed.

FIG. 9 illustrates an exemplary Main Screen 900 of the Location and Tracking software that appears when the software is launched. The Main Screen 900 is the primary screen from which additional screens of the software are accessed via the buttons labeled Maps, Contacts, GPS, Config, Groups, Camera, and Buttons. Main Screen 900 is also the screen to which the user of the software is returned when closing screens associated with the buttons. The Exit button ends execution of the software and returns the user to the Application Launch Screen 800.

Figure 10:
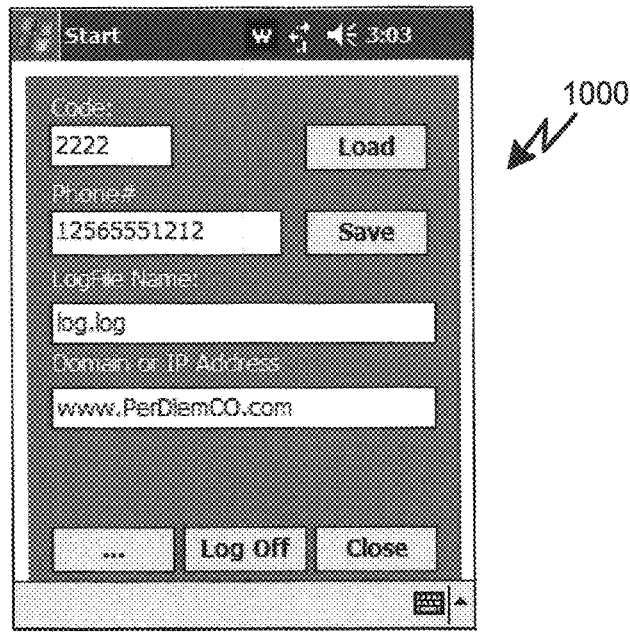
FIG. 10 illustrates an exemplary Configuration Screen of the Location and Tracking software used to manage information corresponding to the user of the PDA.

FIG. 10 illustrates an exemplary Configuration Screen 1000 of the Location and Tracking software used to manage information corresponding to the user of the PDA (or other computing device). The user of the program accesses the Configuration Screen 1000 by selecting the Config button of the Main Screen 900. Configuration Screen 1000 provides fields for entering a user data access code, user phone number, log file name, and a user domain or IP address. The screen is also used to toggle logging on and off.

Figure 11:
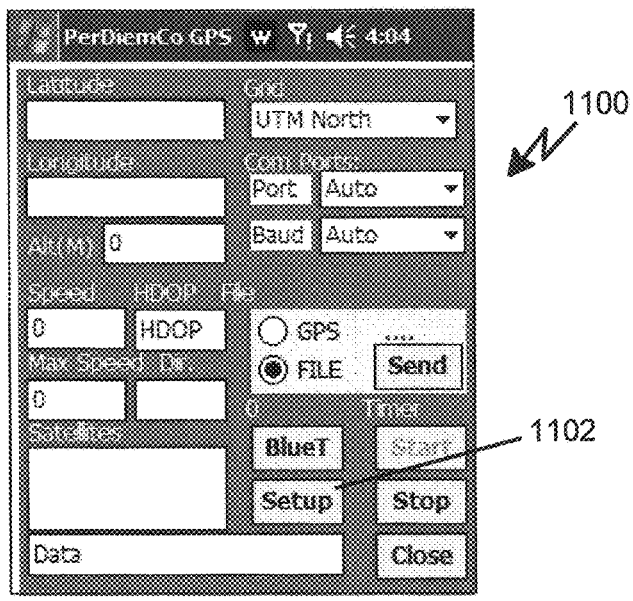
FIG. 11 illustrates an exemplary GPS Screen of the Location and Tracking software used to manage a GPS receiver that is associated with a user's PDA via a Bluetooth connection.

FIG. 11 illustrates an exemplary GPS Screen 1100 of the Location and Tracking software used to manage a GPS receiver that is associated with a user's PDA (or other computing device) via a Bluetooth connection. GPS Screen 1100 includes fields for displaying and controlling GPS device settings, a button for turning the Bluetooth connection on and off, a button for turning the GPS device on and off, and buttons for controlling whether real-time or simulated GPS data is conveyed. GPS Screen 1100 also includes Setup button 1102 used to launch the Tracking Setup Screen.

Figure 12A:
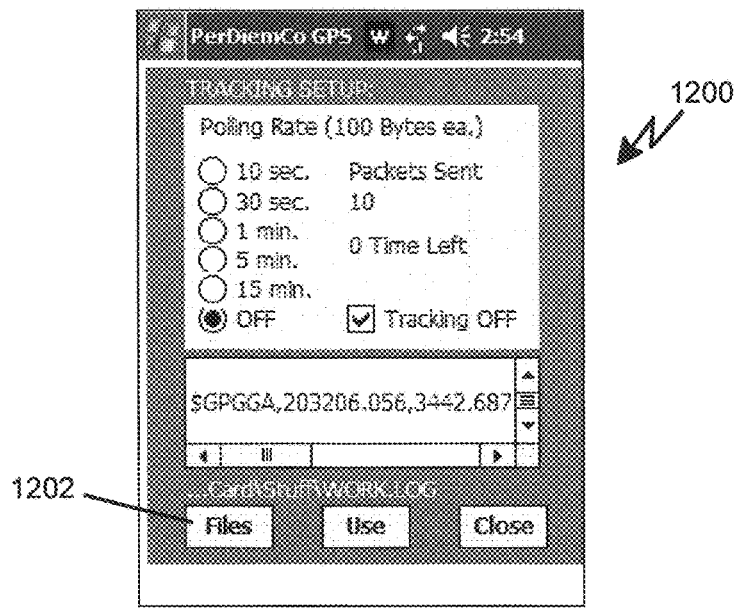
FIG. 12a illustrates an exemplary Tracking Setup Screen of the Location and Tracking software used to control the rate at which GPS data is polled.

FIG. 12a illustrates an exemplary Tracking Setup Screen 1200 of the Location and Tracking software used to control the rate at which GPS information is polled, to examine GPS information records, and to turn on or off the TRACKING mode. Tracking Setup Screen 1200 includes Files button 1202 that is used to launch Log File Selection Screen 1204 that is used to select a log file. A log file can be written to and then later read, as controlled by the Use button, to cause a play back of GPS information.

Figure 12B:
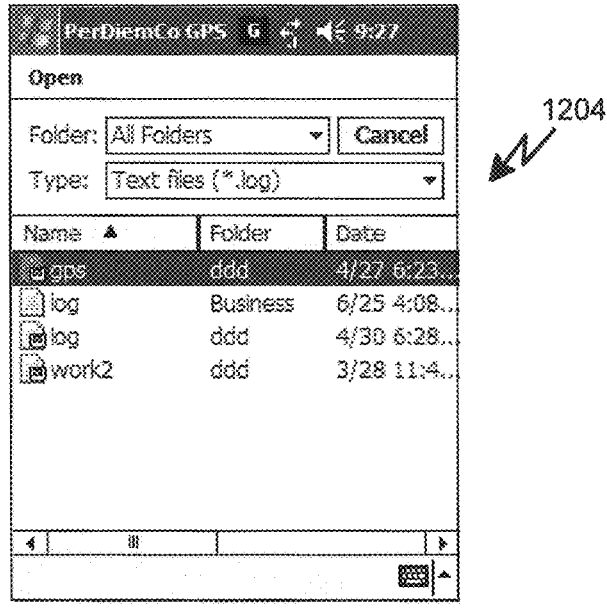
FIG. 12b illustrates an exemplary Log File Selection Screen of the Location and Tracking software used to select a log file for storing GPS information.

FIG. 12*b* illustrates an exemplary Log File Selection Screen 1204 of the Location and Tracking software used to select a log file for storing GPS information. Log File Selection Screen 1024 provides a typical Open dialog window allowing a user to open a log file stored at any storage location to which the user (and the user's device) has access.

Figure 13A:
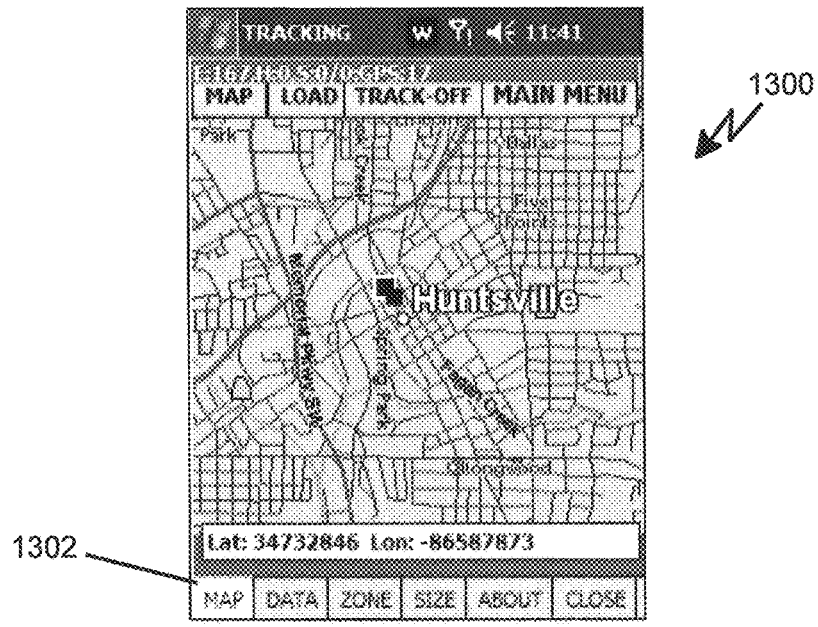
FIG. 13a illustrates an exemplary Map Screen of the Location and Tracking software used to display a map received from a map server.

FIG. 13*a* illustrates an exemplary Map Screen 1300 of the Location and Tracking software used to display a map received from a map server. The Map Screen 1300 is used to request and locate a map using the current latitude and longitude of the user, to turn the TRACKING mode on or off, to display/edit data location records, to create zones, and to size the map. These various functions are controlled via a row of buttons 1302 at the bottom of Map Screen 1300. The row of buttons 1302 is also displayed on the bottom of Data Screen 1304, Zone Screen 1306, Size Screen 1308, and About Screen 1310.

Figure 13B:
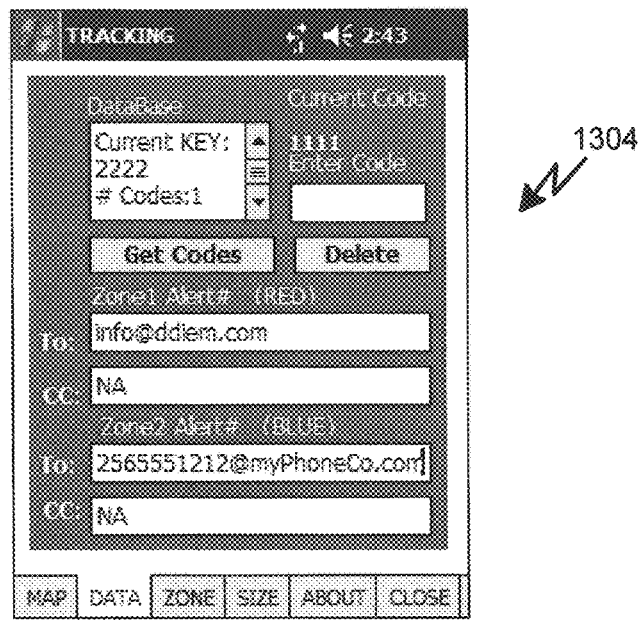
FIG. 13b illustrates an exemplary Data Screen of the Location and Tracking software used to manage conveyance of tracking and zone information to specific users based on access codes.

FIG. 13*b* illustrates an exemplary Data Screen 1304 of the Location and Tracking software used to manage conveyance of tracking and zone information to specific users based on access codes. It is accessed by selecting the Data button included in the row of buttons 1302 displayed on the bottom of Data Screen 1304, Zone Screen 1306, Size Screen 1308, and About Screen 1310. Specifically, Data Screen 1304 is used to set access codes and to associate email addresses and phone alerts with zones.

Figure 13C:
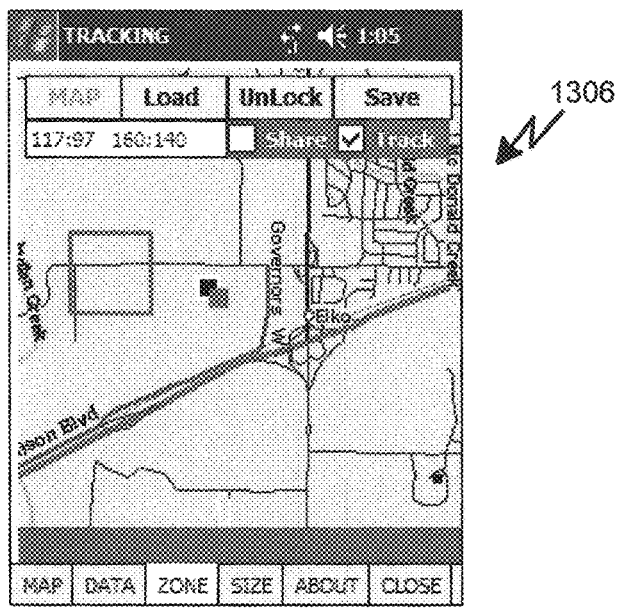
FIG. 13c illustrates an exemplary Zone Screen of the Location and Tracking software used to define user-defined zones.

FIG. 13*c* illustrates an exemplary Zone Screen 1306 of the Location and Tracking software used to define user-defined zones. It is accessed by selecting the Zone button included in the row of buttons 1302 displayed on the bottom of Data Screen 1304, Zone Screen 1306, Size Screen 1308, and About Screen 1310. The Zone Screen is used to define a zone and/or to load a zone defined by another user. A user can use the Zone Screen to control whether zone information is shared (i.e., made public) to other users and to control whether the TRACKING mode is on or off.

Figure 13D:
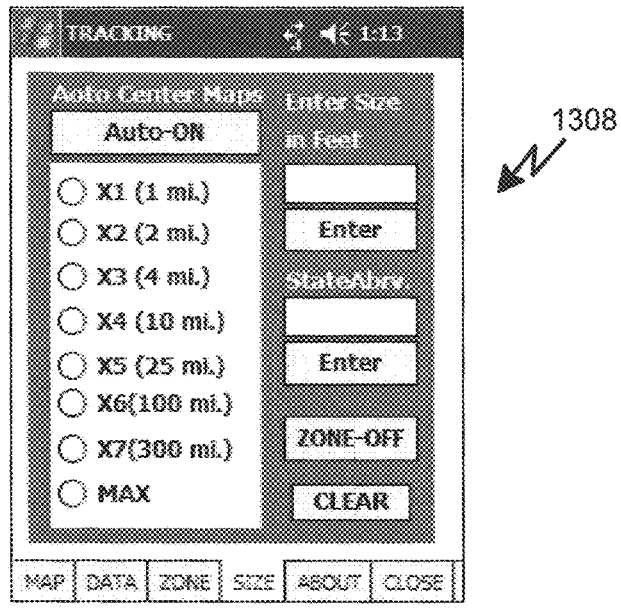
FIG. 13d illustrates an exemplary Size Screen of the Location and Tracking software used to manage the size and other characteristics of a displayed map.

FIG. 13*d* illustrates an exemplary Size Screen 1308 of the Location and Tracking software used to manage the size and other characteristics of a displayed map. It is accessed by selecting the Size button included in the row of buttons 1302 displayed on the bottom of Data Screen 1304, Zone Screen 1306, Size Screen 1308, and About Screen 1310. The Size Screen 1308 is used to set the scale (or zoom) of the map, to turn on or off the display of zone boundaries, and to control auto centering of maps.

Figure 13E:
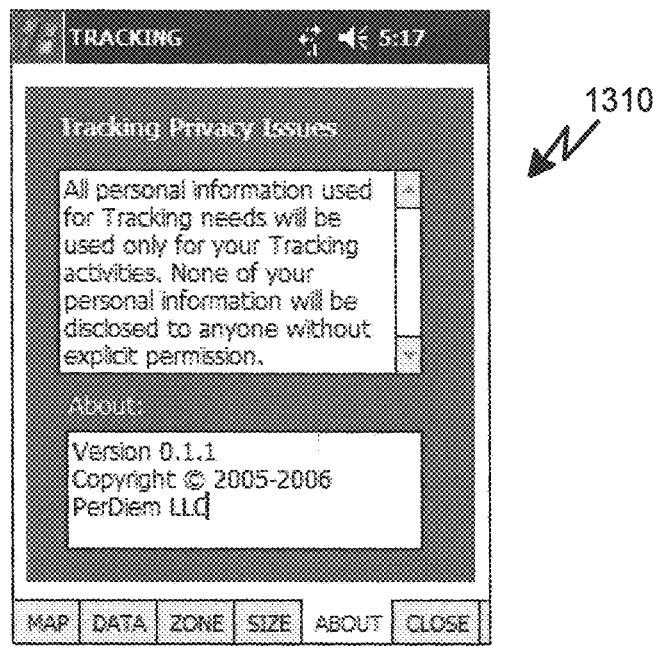
FIG. 13e illustrates an exemplary About Screen of the Location and Tracking software used to provide a notice concerning Tracking Privacy Issues, software version information, and copyright information.

FIG. 13*e* illustrates an exemplary About Screen 1310 of the Location and Tracking software used to provide a notice concerning Tracking Privacy Issues, software version information, and copyright information. It is accessed by selecting the About button included in the row of buttons 1302 displayed on the bottom of Data Screen 1304, Zone Screen 1306, Size Screen 1308, and About Screen 1310.

The row of buttons 1302 displayed on the bottom of Data Screen 1304, Zone Screen 1306, Size Screen 1308, and About Screen 1310 also includes a Close button that when selected returns the user to the Main Screen 900.

Figure 14:
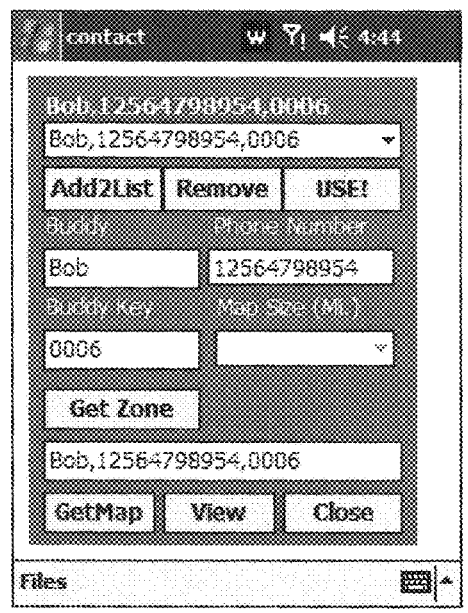
FIG. 14 illustrates an exemplary Group Screen of the Location and Tracking software used to manage information corresponding to groups of contacts.

FIG. 14 illustrates an exemplary Group Screen 1400 of the Location and Tracking software used to manage information corresponding to groups of contacts. The Group Screen 1400 is used to add or remove users from a stored 'buddy list' containing the user name, phone number and code for each 'buddy'. If a public zone is available it can be selected and loaded into the user's device. Users share access codes in order to share zones. As such, a user tells another user the access code needed to load a zone.

Figure 15:
FIG. 15 illustrates an exemplary Contact Screen of the Location and Tracking software used to manage information corresponding to contacts.

FIG. 15 illustrates an exemplary Contact Screen 1500 of the Location and Tracking software used to manage information corresponding to contacts (i.e., other users). The Contact Screen 1500 allows the user to populate information corresponding to contacts such as name and address information.

Figure 16:
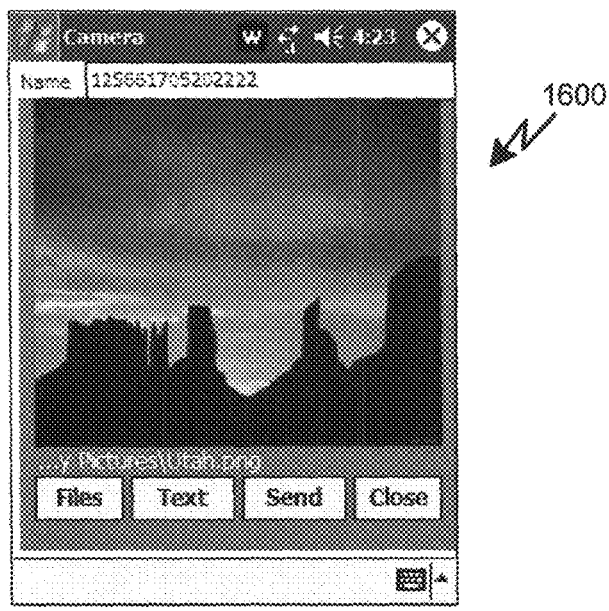
FIG. 16 illustrates an exemplary Camera Screen of the Location and Tracking software used to manage pictures to be associated with contact location information.

FIG. 16 illustrates an exemplary Camera Screen 1600 of the Location and Tracking software used to manage pictures associated with user location information. The Camera Screen 1600 is used to associate pictures and text with a user and to convey the picture information to other users. The pictures correspond to information packages described generally above, which could also include other forms of information. The Camera Screen 1600 could alternatively be a Device Screen that controlled multiple devices including cameras, motion sensors, garage doors, web cams, etc. and corresponding information as described previously. As described previously, picture or other information packages can be associated with zone information or event information.

Figure 17:
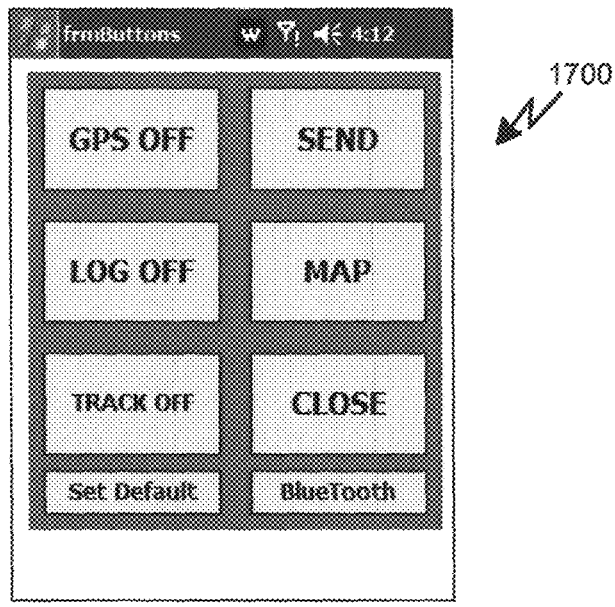
FIG. 17 illustrates an exemplary Big Buttons Screen of the Location and Tracking software used to provide easy access to key application commands while walking or driving.

FIG. 17 illustrates an exemplary Big Buttons Screen 1700 of the Location and Tracking software used to provide easy access to key application commands while walking or driving.

Figure 18:
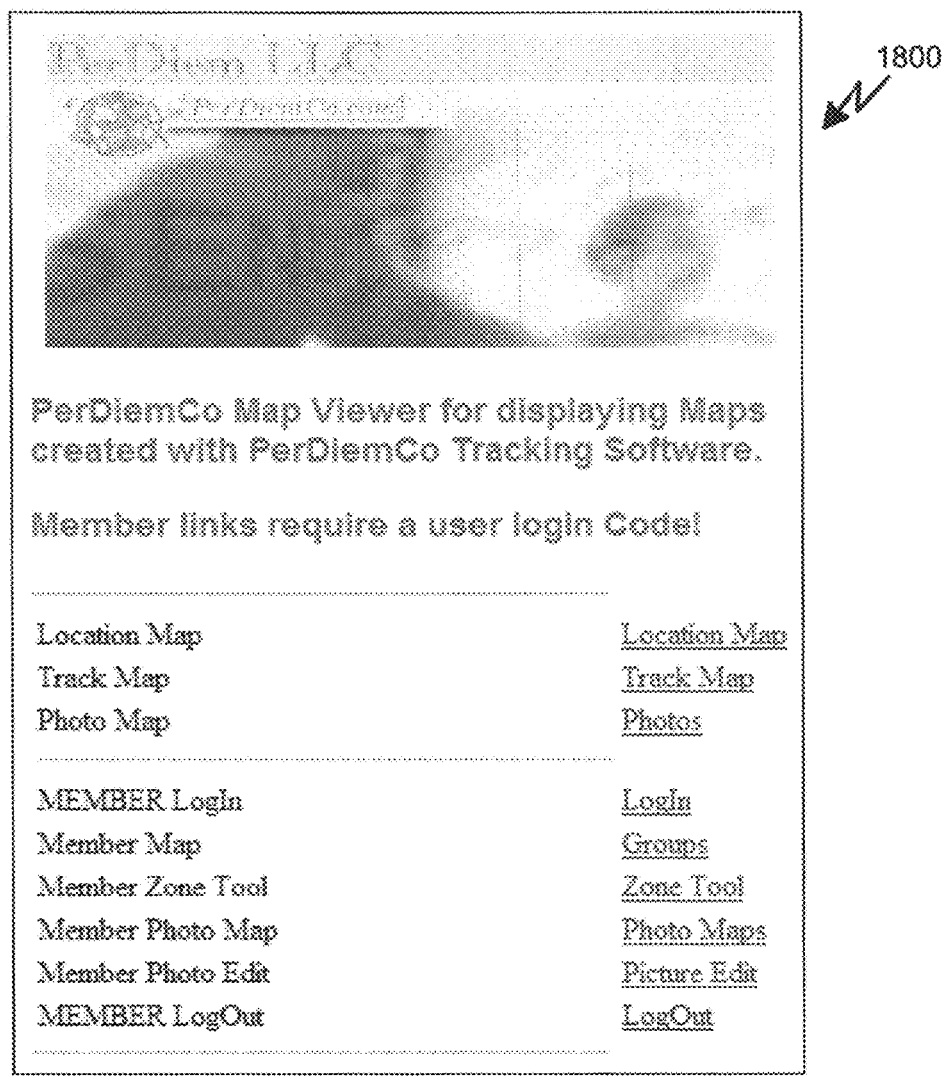
FIG. 18 illustrates an exemplary Map Viewer Web Page used for displaying maps and other information conveyed by the Location and Tracking software.

FIG. 18 illustrates an exemplary Map Viewer Web Page 1800 used for displaying maps and other information conveyed by the Location and Tracking software.

Figure 19:
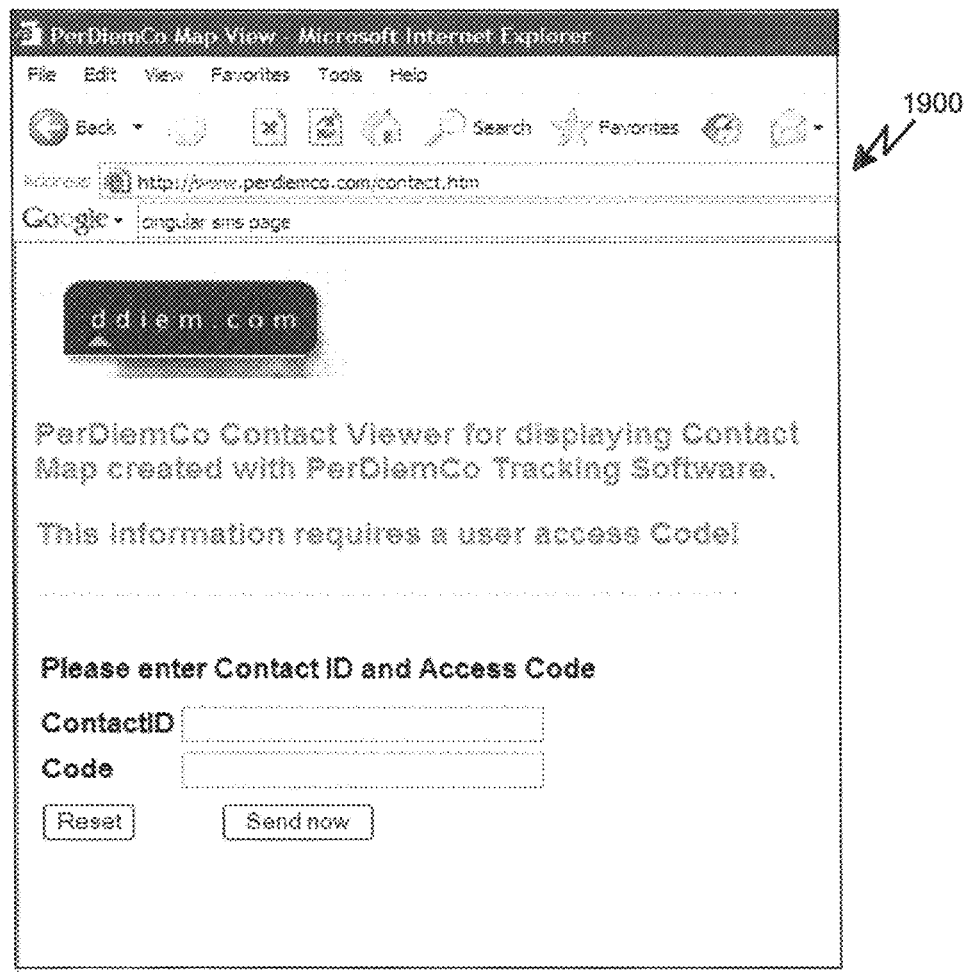
FIG. 19 illustrates an exemplary Contact Viewer Web Page used for displaying contact information conveyed by the Location and Tracking software.

FIG. 19 illustrates an exemplary Contact Viewer Web Page 1900 used for displaying contact information conveyed by the Location and Tracking software.

Figure 20:
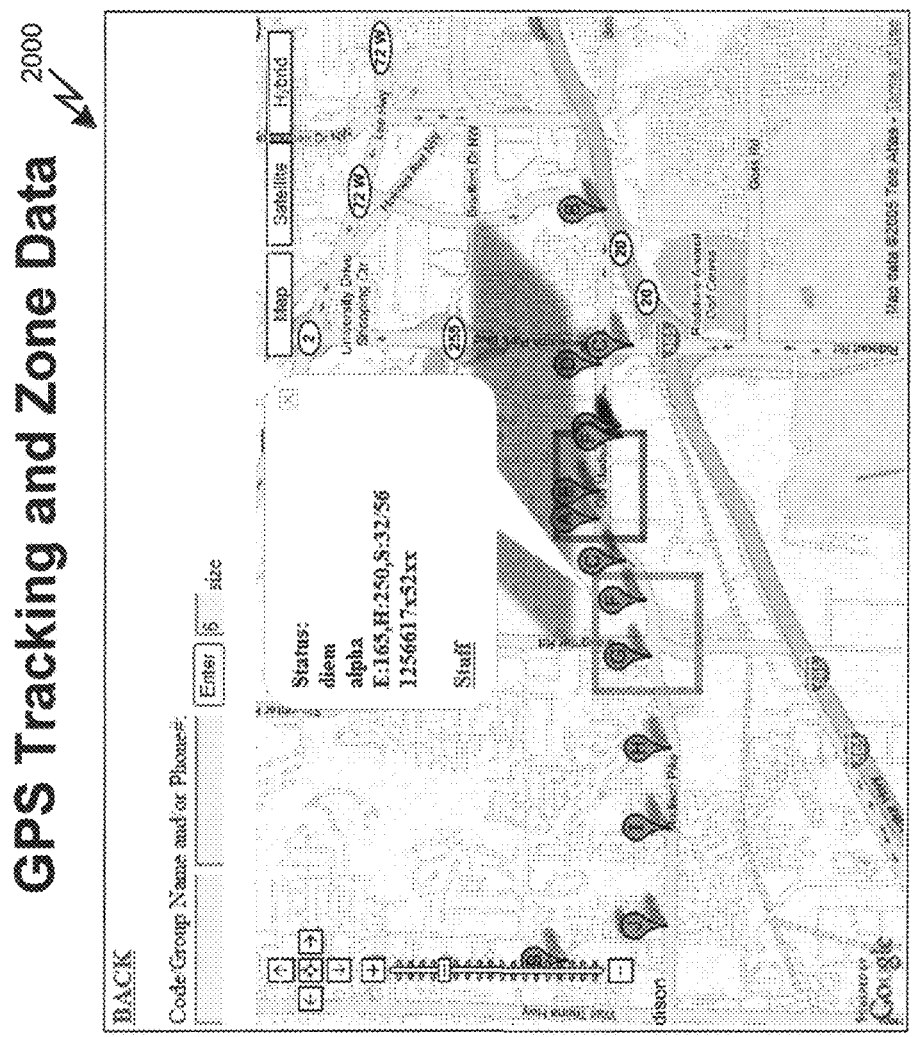
FIG. 20 illustrates an exemplary web page-based display of a map overlaid with GPS tracking and zone information conveyed by the Location and Tracking software.

FIG. 20 illustrates an exemplary web page-based display of a map 2000 overlaid with GPS tracking and zone information conveyed by the Location and Tracking software. In FIG. 20, balloon icons labeled alphabetically that indicate logged locations of a user for which information is available. Also shown are two zones represented by rectangles. When a given balloon is selected, information is displayed, for example, as shown in the information box in the center of the map corresponding to the balloon labeled F. Similarly, information is displayed corresponding to either of the zones when either is selected.

Figure 21:
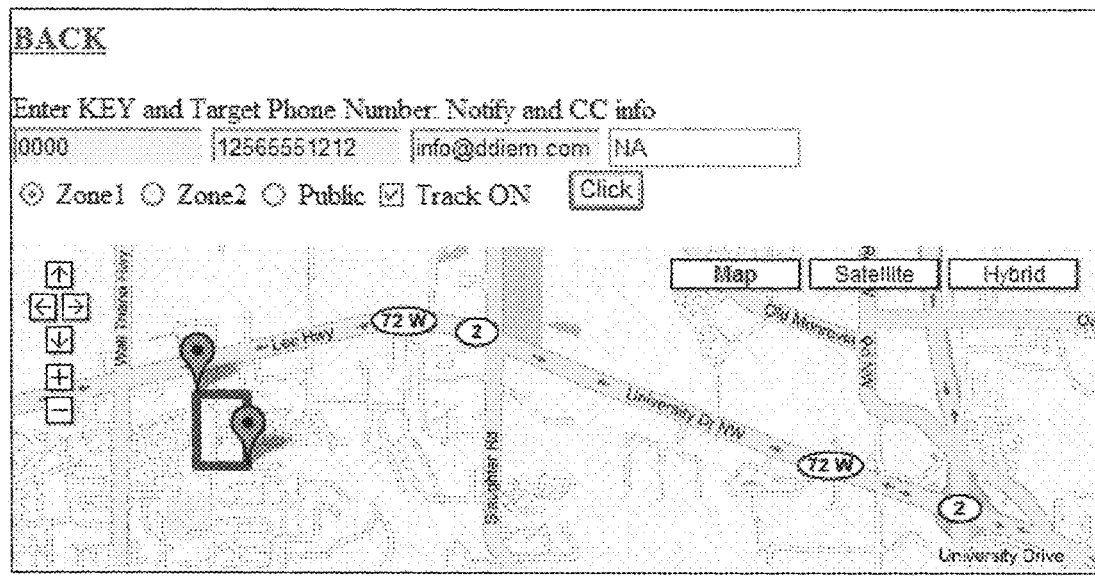
FIG. 21 illustrates an exemplary web page for creation of a zone used by the Location and Tracking software.

FIG. 21 illustrates an exemplary web page for creation of zones 2100 that can be used with the Location and Tracking software. As shown in FIG. 21, a zone is created by selecting a first point on a map indicated by a first balloon and dragging to another point on a map indicated by a second balloon where the two points correspond to opposite corners of a rectangle representing the user-defined zone boundary.

Figure 22:
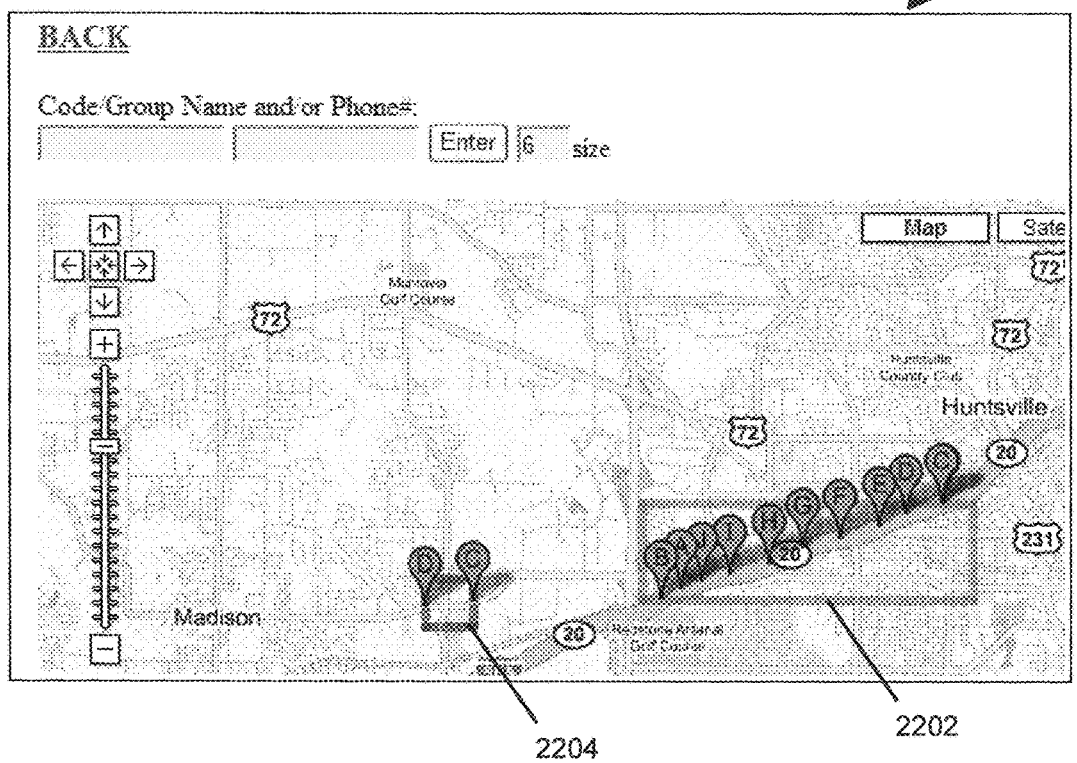
FIG. 22 illustrates an exemplary map displayed on a web page depicting logging of contact location information while a contact is within a zone and logging of contact location information when a contact enters or leaves a zone.

FIG. 22 illustrates an exemplary map displayed on a web page 2200 depicting logging of user location information while a user is within a zone and logging of user location information when a user enters or leaves a zone. As depicted in FIG. 22, one type of zone 2202 provides user location information periodically while a user is within the zone. Another type of zone 2204 only provides user location information when the user enters or exits the zone.

Figure 23:
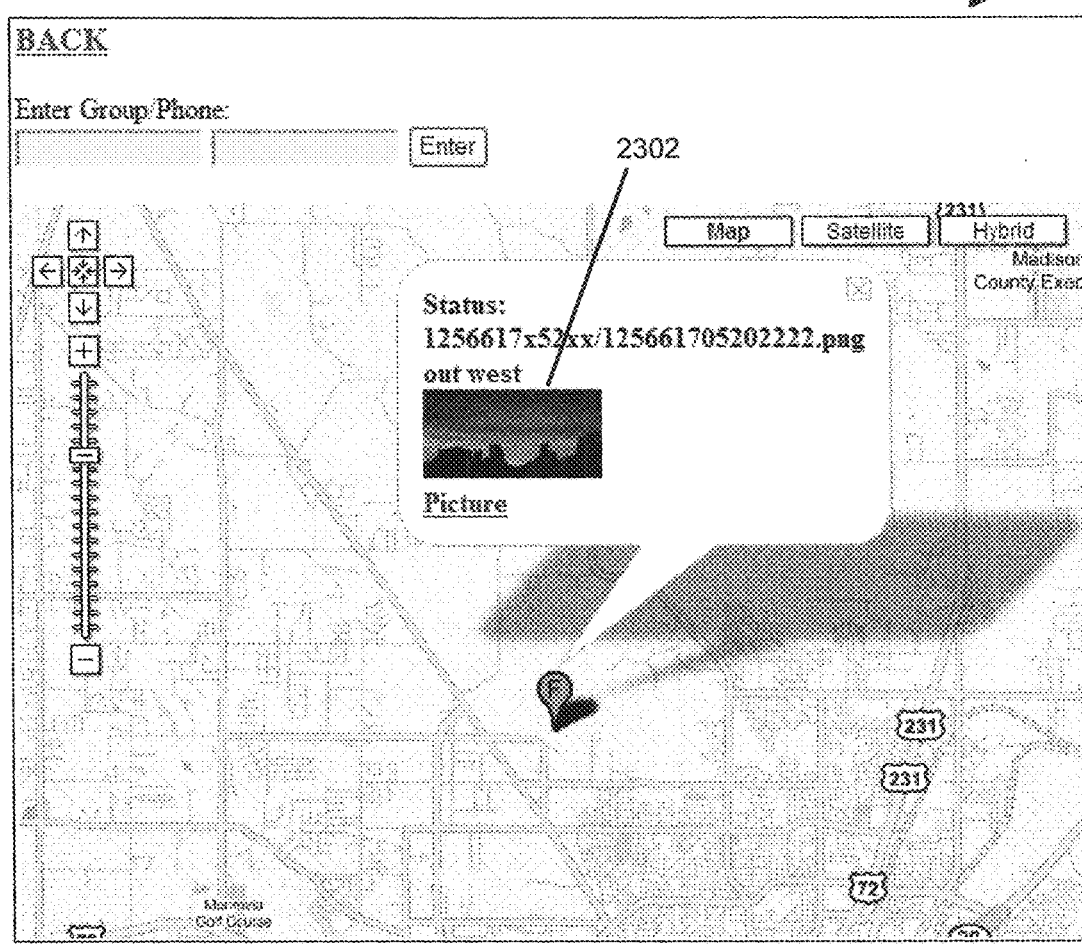
FIG. 23 illustrates an exemplary map displayed on a web page depicting a picture associated with a location of a contact.

FIG. 23 illustrates an exemplary map displayed on a web page 2300 depicting a picture associated with a location of a user. As shown in FIG. 23, a balloon labeled F corresponds to a location of a user. An information package consisting of a picture that has been associated with the user's location is available as part of the information displayed when the balloon is selected. In the information window is a thumbnail of the picture which when selected displays the fully enlarged picture.

The Location and Tracking software described herein was provided as an example of the types of applications that are enabled by the present invention. While particular embodiments and several exemplary applications (or implementations) of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

The invention claimed is:

1. A method for controlling conveyance of event information in a tracking service provided to authorized users who track vehicles that use a plurality of electronic logging devices (ELDs), wherein an ELD administrator of the tracking service provides access to user accounts in a first database management system application (DBMSA) executed by one or more central or distributed servers that provide user interfaces to the authorized users to log into to their respective user accounts, said DBMSA having access to a first database (DB) that identifies the ELDs by corresponding ELD IDs, the vehicles by corresponding Vehicles IDs (VIDs), the authorized users including drivers of a group of vehicles by corresponding User IDs (UIDs), and the group by a group ID (GID), wherein a Driver administrator of the group is given a privilege to access an administrator account in the first DBSMA by the ELD administrator, the method comprising the steps of:
 a. interfacing over one or more wireless networks with the plurality of ELDs including a first ELD and a second ELD that are respectively identified by a first ELD ID and a second ELD ID, wherein each ELD comprises one or more processors that execute a location tracking application (LTA), said each ELD being configured to:
  i. receive a power up sensor information from one or more sensors that indicate a vehicle in the group that uses the ELD is powered up by a driver of the vehicle, said power up sensor information being received in order to record one or more driving events after the driver logs into a driver user account via the ELD;
  ii. periodically receive location information from a location information source (LIS) used by the ELD;
  iii. log location information received from the LIS, said location information indicating where driving event conditions for occurrence of driving events are met;
  iv. record a driving event information related to a first driving event that occurs based on a first driving event condition, wherein the recorded driving event information comprises a logged location information that indicates where the first driving event occurs;
  v. provide a log-in interface via the LTA that allows the driver to log into the driver user account in the first DBMSA with a driver user ID and a driver password to access the recorded driving event, and
  vi. provide an ELD interface via the LTA that allows the driver to edit the recorded driving event information after the driver logs into the driver user account; and
 b. interfacing over one or more wired or wireless networks with a computing device that is configured to enable the Driver administrator to log into the administrator account by providing an administrator ID and an administrator password in order to:
  i. identify a first vehicle by a first VID and a second vehicle by a second VID, said first VID and second VID being associated with the GID,
  ii. specify a first authorized user identified by a first UID as a first driver of the first vehicle which uses the first ELD,
  iii. specify a second authorized user identified by a second UID as a second driver of the second vehicle which uses the second ELD, and
  iv. specify one or more recipients who are authorized to receive recorded driving event information;
 c. receiving a first recorded driving event information from the first ELD containing the first UID;
 d. receiving a second recorded driving event information from the second ELD containing the second UID driver; and
 e. sending notifications to one or more recipients who are authorized by the Driver administrator to receive the first recorded driving event information or the second recorded driving event information.

2. The method of claim 1, wherein the first driving event condition is a condition applied to the group of the first vehicle and the second vehicle.

3. The method of claim 1, wherein the first driving event condition is met based on a sensed vehicle movement.

4. The method of claim 1, wherein the first driving event condition is met based on a sensed vehicle speed.

5. The method of claim 1, wherein the first event condition is a pre-defined event condition specified at the application level of DBMSA by the ELD administrator.

6. The method of claim 5, wherein the first driving event condition is based on a pre-defined zone.

7. The method of claim 6, wherein the pre-defined zone is based on State Plane Coordinates, wherein the logged location information indicates a movement of the first vehicle or the second vehicle within a State boundary, wherein the movement within the State boundary is recorded to be reviewed at a later time by a reviewer.

8. The method of claim 1, wherein a second driving event condition is defined at a user level by the Driver administrator, wherein a second event different from the first event occurs when the second driving event condition is met.

9. The method of claim 8, wherein the second driving event condition is met based on locations of the first vehicle or the second vehicle relative to a user-defined zone.

10. The method of claim 9, where in the user-defined zone is drawn on a map.

11. The method of claim 9, wherein the user-defined zone is created based on perimeter coordinates of a surveyed property stored in a DB.

12. The method of claim 8, wherein the second driving event condition is based on (1) information received from a sensor in the first ELD or in the second ELD or (2) location information received from a first LIS used by the first ELD or a second LIS used by the second ELD.

13. The method of claim 1, wherein the first driver uses an ELD interface of the first ELD to turn off a tracking mode.

14. The method of claim 13, wherein the first driver is tracked in the at least two different tracking modes while a first LIS used by the first ELD remains activated in both modes including when the tracking mode is turned off by the first driver.

15. The method of claim 1, wherein the Driver administrator is enabled to specify access privileges for a third authorized user having a third user account in the DBMSA, wherein the third authorized user controls access privileges of at least one of the first driver or the second driver.

16. The method of claim 1, further including the step
   (d) receiving a file originated at the first ELD or at the second ELD that contains either (1) shipping information associated with one or more objects inside the first vehicle or inside the second vehicle or (2) shipping information associated with one or more trailers that are attached to the first vehicle or to the second vehicle; and
   (e) sending the file to a recipient authorized by the Driver administrator.

17. The method of claim 1, wherein the first event condition is based on a vehicle non-movement.

18. The method of claim 1, further including the steps:
   (d) of receiving one or more information packages originated at the first ELD or at the second ELD when a second event different from the first event occurs based a second driving event condition different form the first event condition, wherein the second driving event condition is met based on a sensed measure of a physical characteristic at the first vehicle or the second vehicle, wherein the information package contains a video, an image or an audio file; and
   (e) sending the one of more information packages to a recipient authorized by the Driver administrator.

19. The method of claim 1, wherein the first DBMSA interfaces with a second DB that is accessible by a second DBMSA maintained by the Driver administrator.

20. The method of claim 1, further including the step (b)(vi) of specifying a third authorized user identified by a third UID in the group based on a role in an organization, said role allowing the third authorized user to specify a sub-group within the group.

21. The method of claim 1, wherein logging of said location information starts from when the first vehicle or the second vehicle exits one boundary and ends when the first vehicle or the second vehicle enters another boundary, thereby allowing a movement of the first vehicle or the second vehicle between two boundaries to be reviewed at a later time by a reviewer.

22. The method of claim 1, further including the steps of:
   (d) storing said location information in a log file; and
   (e) sending the log file to a computing device for playing back the stored location information.

23. The method of claim 1, further including the step (d) of sending a message to the first ELD or the second ELD.

24. The method of claim 1, wherein icons indicate the location of the first vehicle or the second vehicle on a depicted map as the first vehicle or the second vehicle travels between a first boundary and a second boundary.

25. The method of claim 24, wherein an icon when selected is set to display a status in the first vehicle or the second vehicle.

26. The method of claim 25, wherein the status is related to a sensed measure at the first vehicle or the second vehicle.

27. The method of claim 26, wherein the sensed measure is related to location of the first vehicle or the second vehicle.

28. The method of claim 26, wherein a logged location information indicates where the sensed measure is made.

29. The method of claim 1, wherein each authorized user is given a user access privilege based on a role in an organization after logging into a corresponding user account, wherein the Driver administrator is given a privilege by the ELD administrator to specify user access privileges to classes of information, including a class of driver information that are accessible by the drivers of the group of vehicles.

30. The method of claim 1, wherein the first event condition is met based on a driver input at a user interface provided by the first ELD or the second ELD.

31. A The method of claim 1, wherein the recorded event information is edited by writing into a file stored in the ELD.

32. The method of claim 1, wherein a logged location information indicates where a sensor measurement is made at the first vehicle or a second vehicle.

* * * * *